(12) United States Patent
Ciardullo

(10) Patent No.: US 8,526,079 B2
(45) Date of Patent: Sep. 3, 2013

(54) HIGH-SPEED DIGITAL SCANNER AND METHOD

(76) Inventor: Jean-Paul Ciardullo, New York, NY (US)

( * ) Notice: Subject to any disclaimer, the term of this patent is extended or adjusted under 35 U.S.C. 154(b) by 297 days.

(21) Appl. No.: 12/925,627

(22) Filed: Oct. 26, 2010

(65) Prior Publication Data

US 2012/0099167 A1    Apr. 26, 2012

(51) Int. Cl.
*H04N 1/04* (2006.01)
(52) U.S. Cl.
USPC ............ 358/496; 358/498; 358/494; 358/474
(58) Field of Classification Search
USPC ................. 358/496, 498, 494, 474, 492, 505
See application file for complete search history.

(56) References Cited

U.S. PATENT DOCUMENTS

| | | | |
|---|---|---|---|
| 2,262,584 A | 11/1941 | Herriott | |
| 3,153,870 A | 10/1964 | Carlton | |
| 4,002,823 A | 1/1977 | Van Oosterhout | |
| 4,953,841 A | 9/1990 | Polarek | |
| D311,219 S | 10/1990 | Bergh | |
| 4,975,735 A | 12/1990 | Bright et al. | |
| 5,659,838 A | 8/1997 | Ando et al. | |
| 5,745,176 A | 4/1998 | Lebens | |
| 5,956,925 A | 9/1999 | Ruble, III | |
| 5,967,328 A | 10/1999 | Ziberna | |
| 5,974,903 A | 11/1999 | Shirley et al. | |
| 6,043,866 A | 3/2000 | Kawai et al. | |
| 6,332,536 B2 | 12/2001 | Easton | |
| 6,522,777 B1 | 2/2003 | Paulsen et al. | |
| 6,823,652 B2 | 11/2004 | Troxtell, Jr. | |
| 6,864,498 B2 * | 3/2005 | Katzir et al. | ............. 250/559.45 |
| 6,956,963 B2 | 10/2005 | Ulrich et al. | |
| 7,161,717 B2 | 1/2007 | Lee | |
| 7,405,850 B2 * | 7/2008 | Chang | ........................... 358/496 |
| 7,684,608 B2 | 3/2010 | Chen et al. | |
| 7,751,092 B2 | 7/2010 | Sambongi | |
| 2001/0001695 A1 | 5/2001 | Tatsumi | |
| 2001/0040117 A1 | 11/2001 | Easton | |
| 2003/0101692 A1 | 6/2003 | Behnke | |
| 2005/0088528 A1 | 4/2005 | Sambongi | |
| 2006/0017676 A1 | 1/2006 | Bowers et al. | |

OTHER PUBLICATIONS

International Searching Authority, International Search Report and Written Opinion for PCT Application No. US2011/001798, Mailed Feb. 1, 2012.
www.scanmyphotos.com website, last viewed Oct. 25, 2010.
Accordian photo wallet, last viewed at www.walletgear.com, Oct. 25, 2010.
Kodak i1200 Scanner brochure, downloaded from www.kodak.com on Oct. 25, 2010.

* cited by examiner

*Primary Examiner* — Houshang Safaipour
(74) *Attorney, Agent, or Firm* — Gregor N. Neff

(57) ABSTRACT

Devices and methods are disclosed for the high speed digitization of large collections of thin, flexible sheets such as photographic prints. The sheets are inserted into transparent pockets on an elongated belt, and the belt is driven rapidly without stopping past a high speed digital camera. A glare reduction means is employed to avoid glare off the transparent pockets, and motion blur is eliminated through the use of high speed strobe illumination or a high speed shutter. The invention can be commercialized by having a customer load the belt with photographs (or other thin sheets) and deliver the belt to a processing location. Digital images of the sheets may then be provided to the customer, and the original sheets may be left in the pockets on the belt for convenient storage.

34 Claims, 22 Drawing Sheets

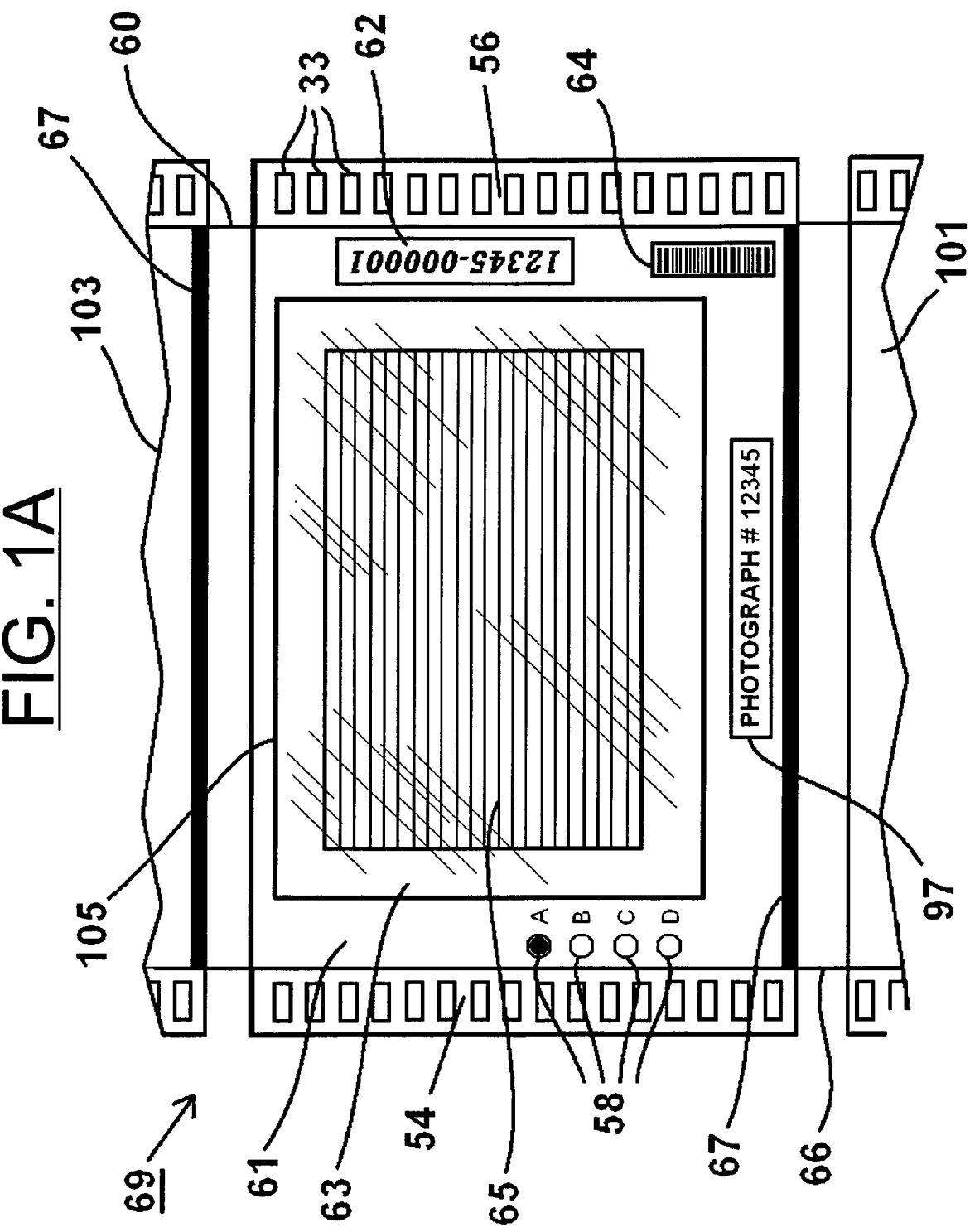

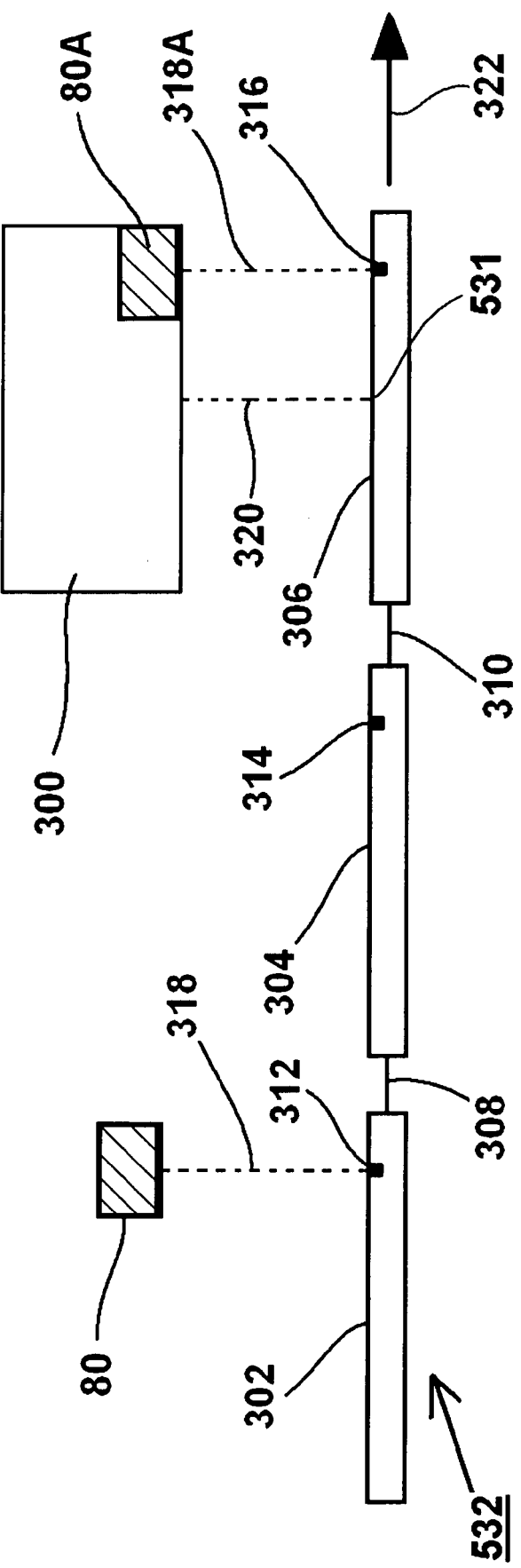

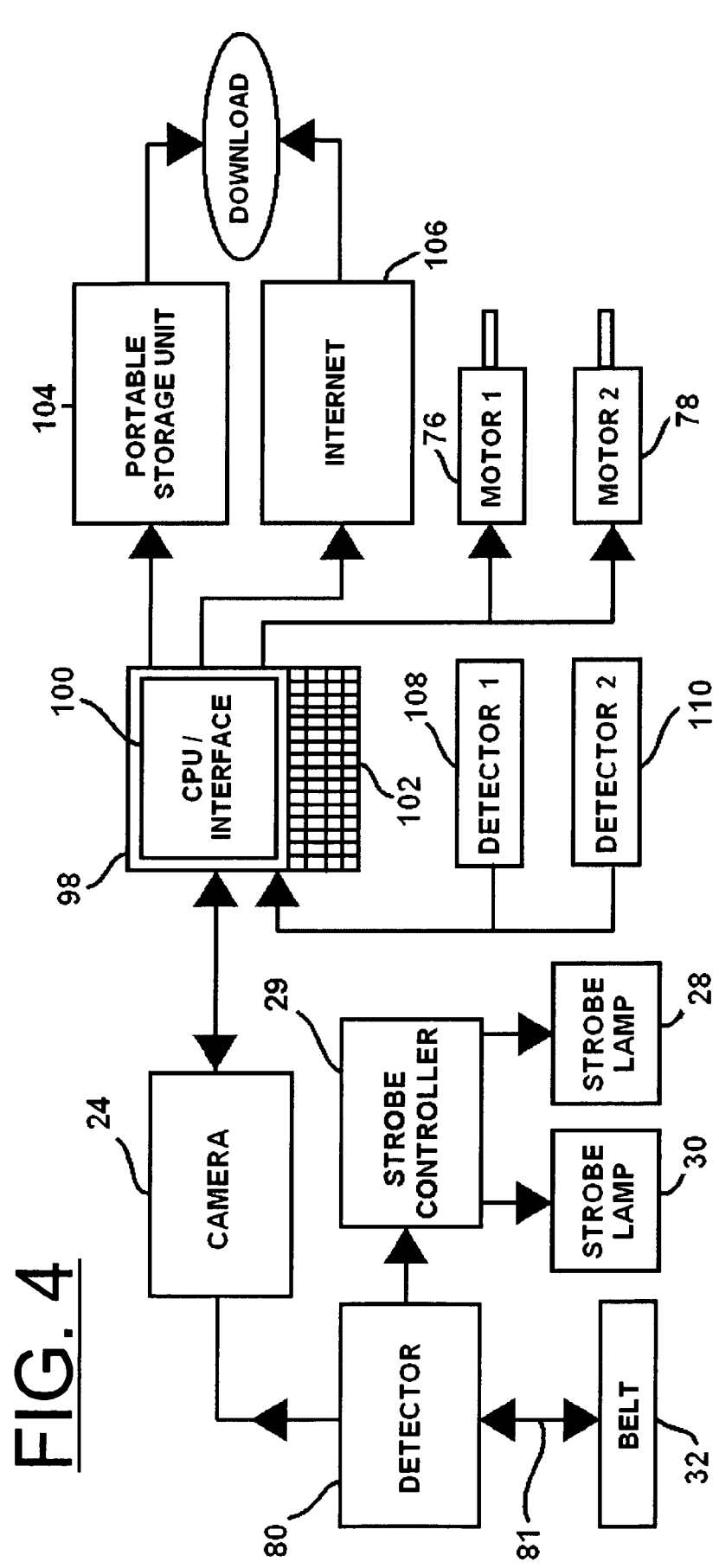

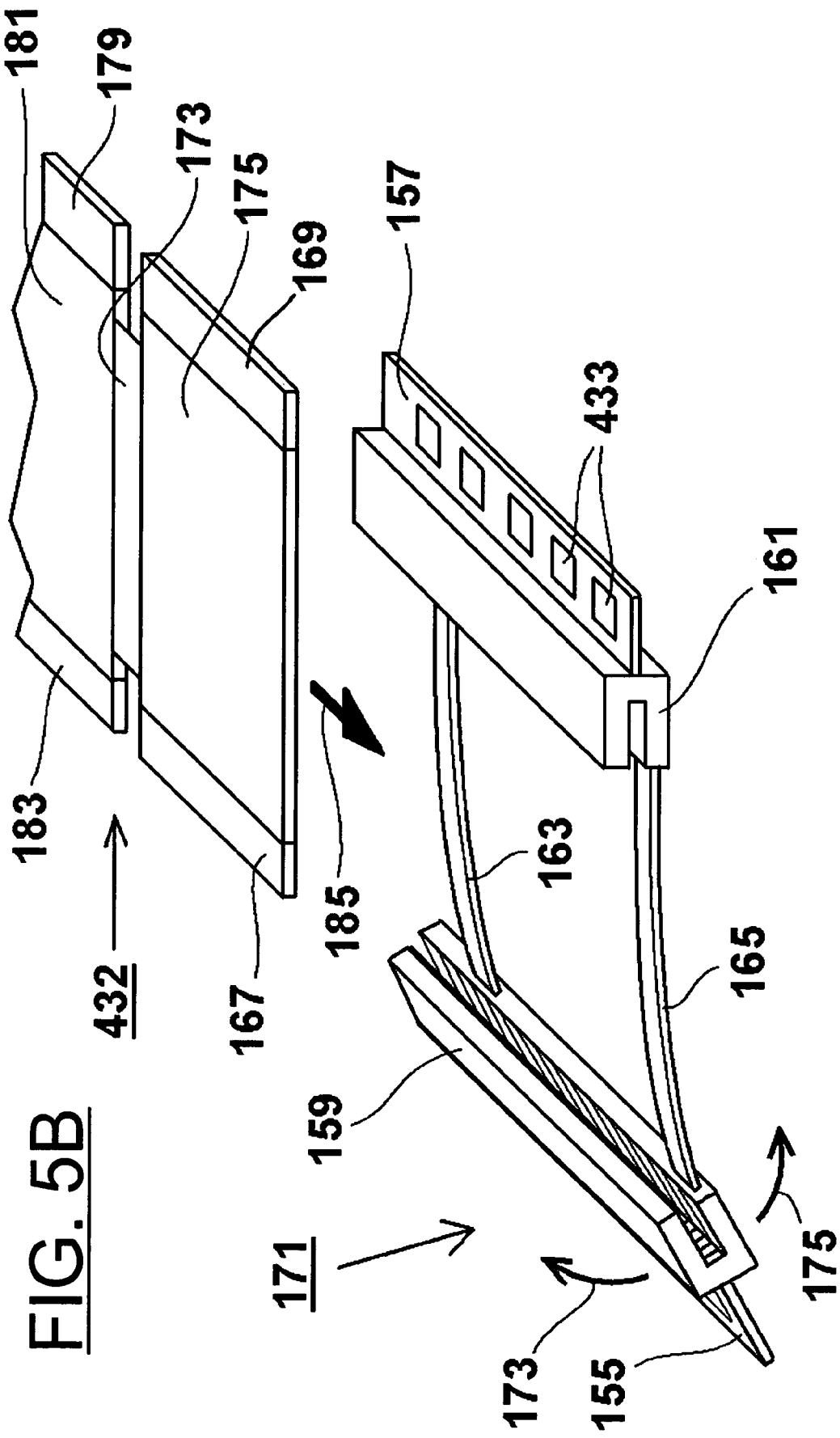

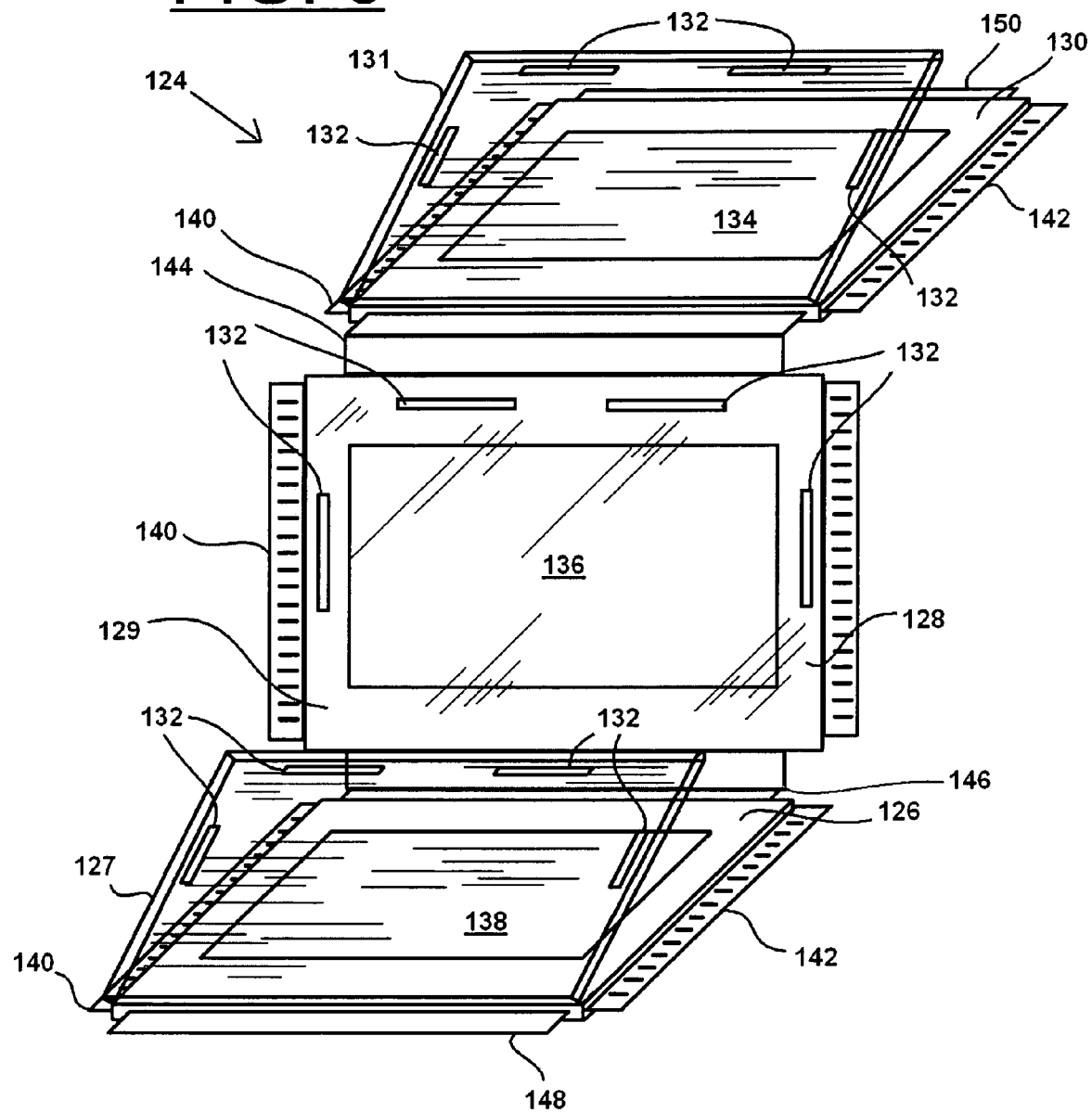

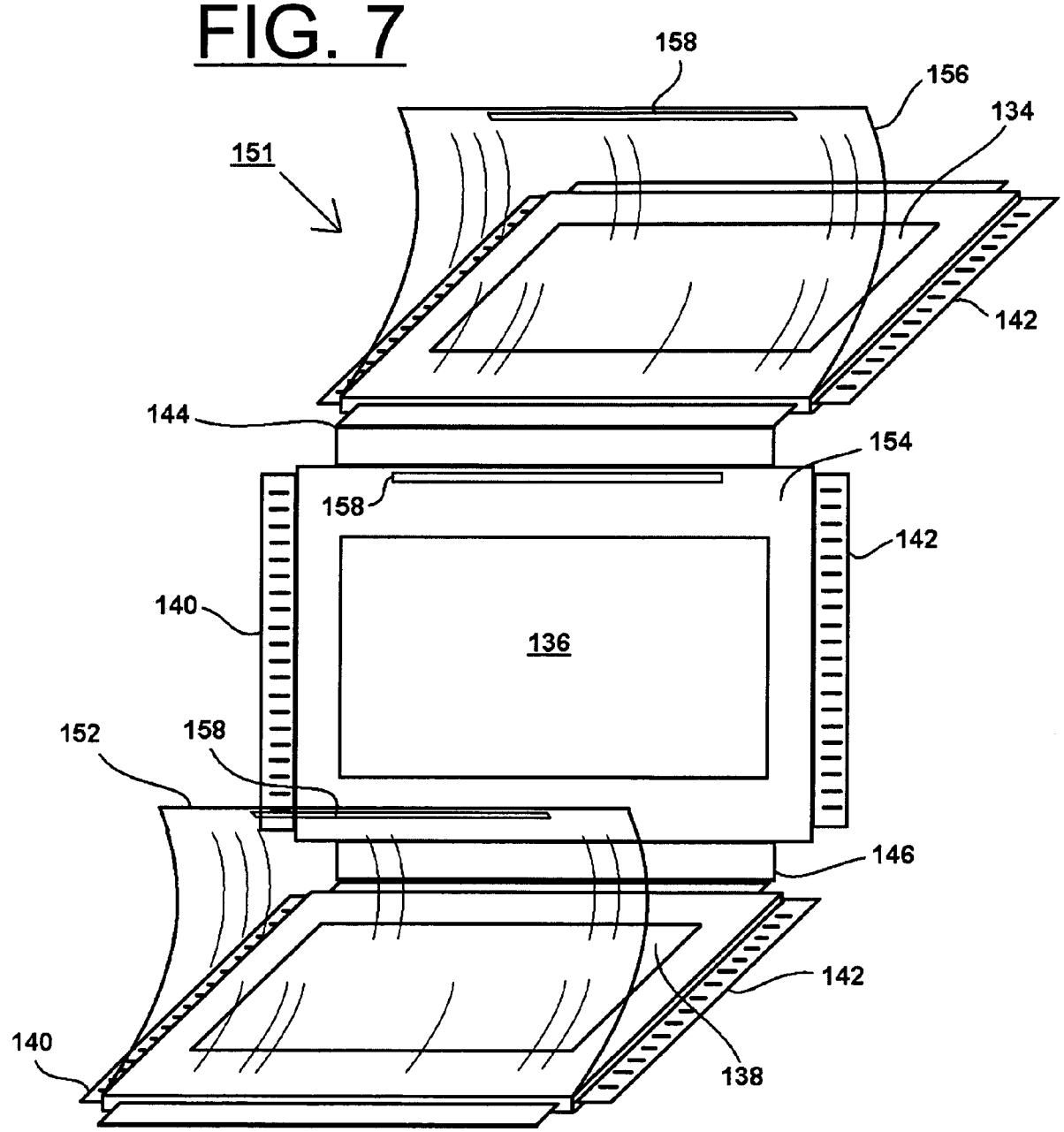

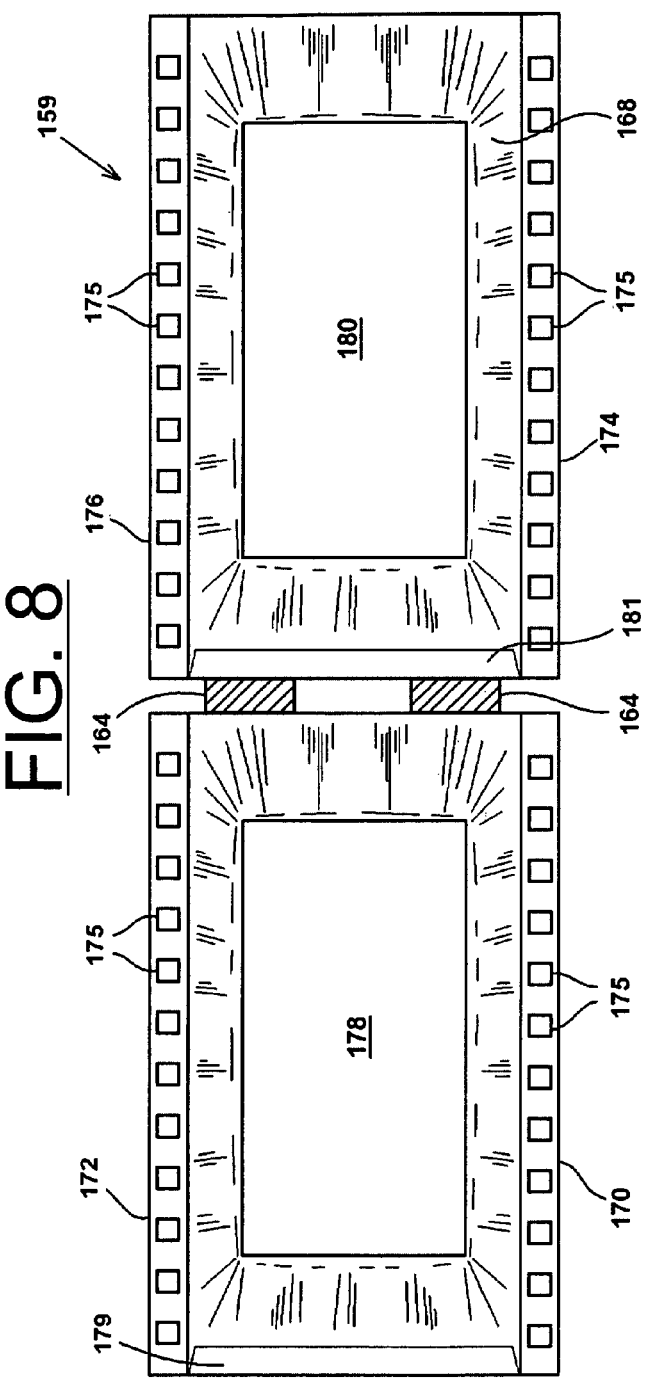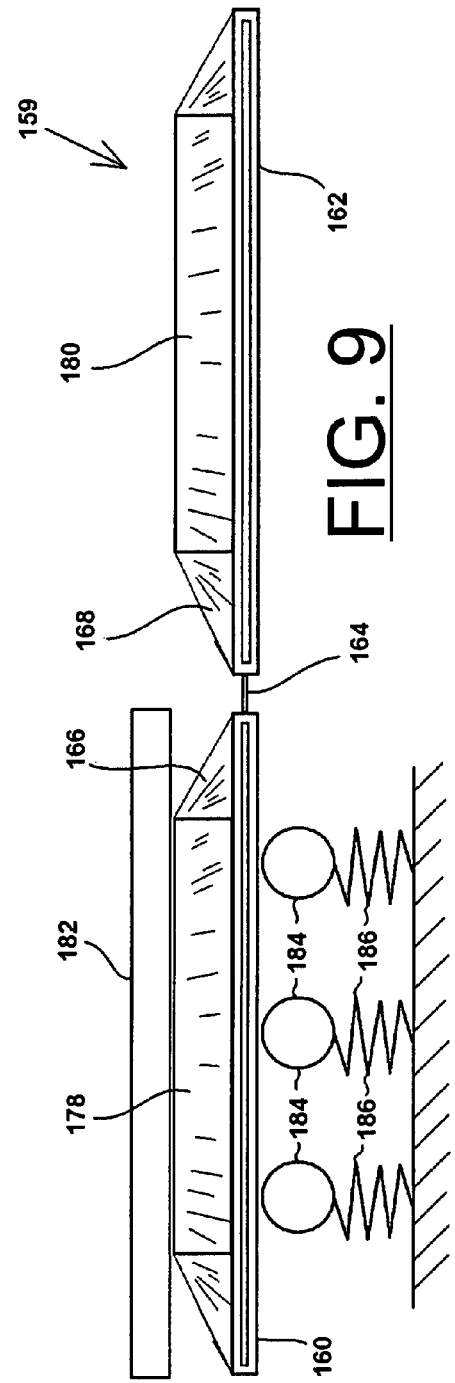

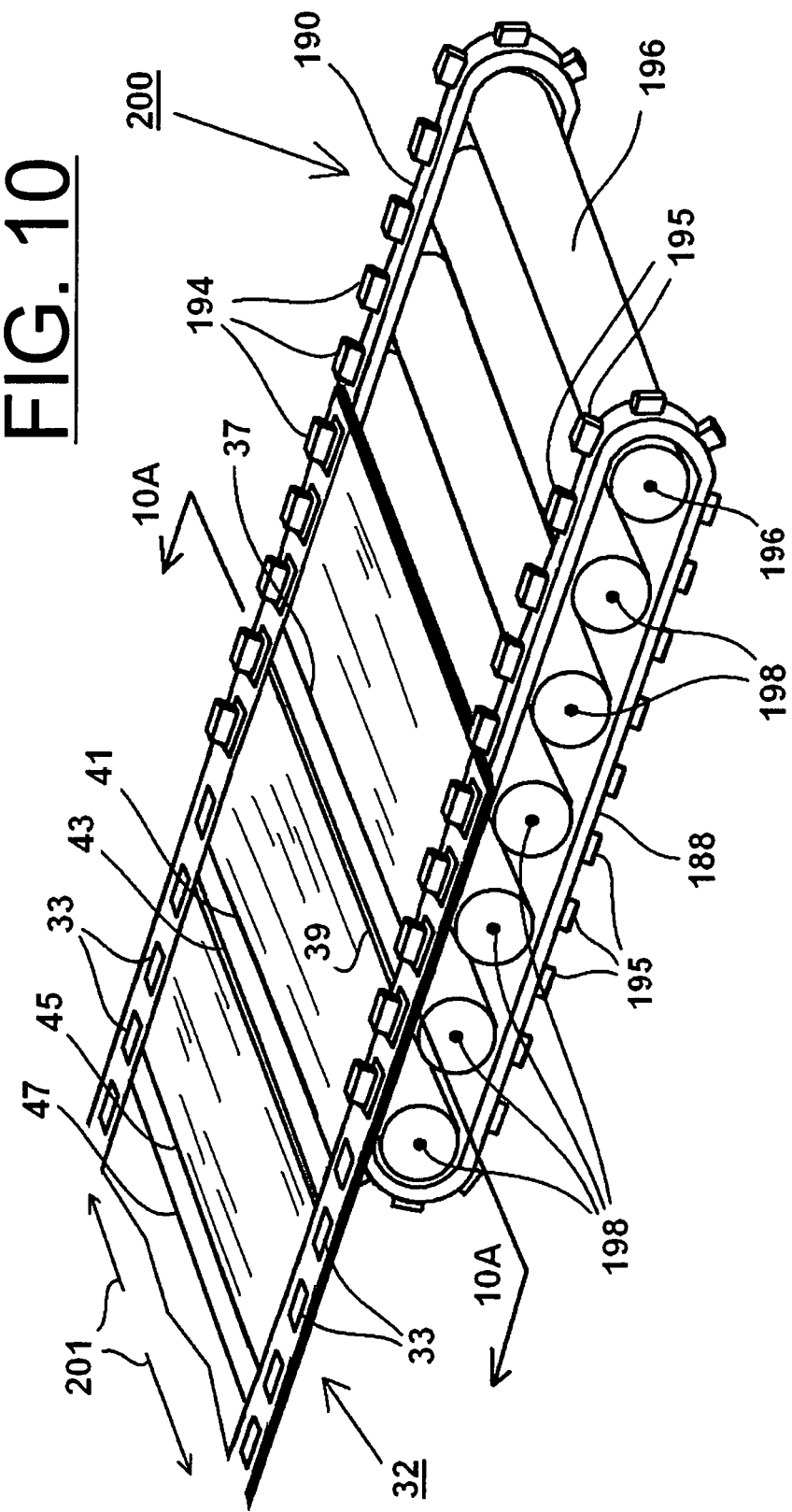

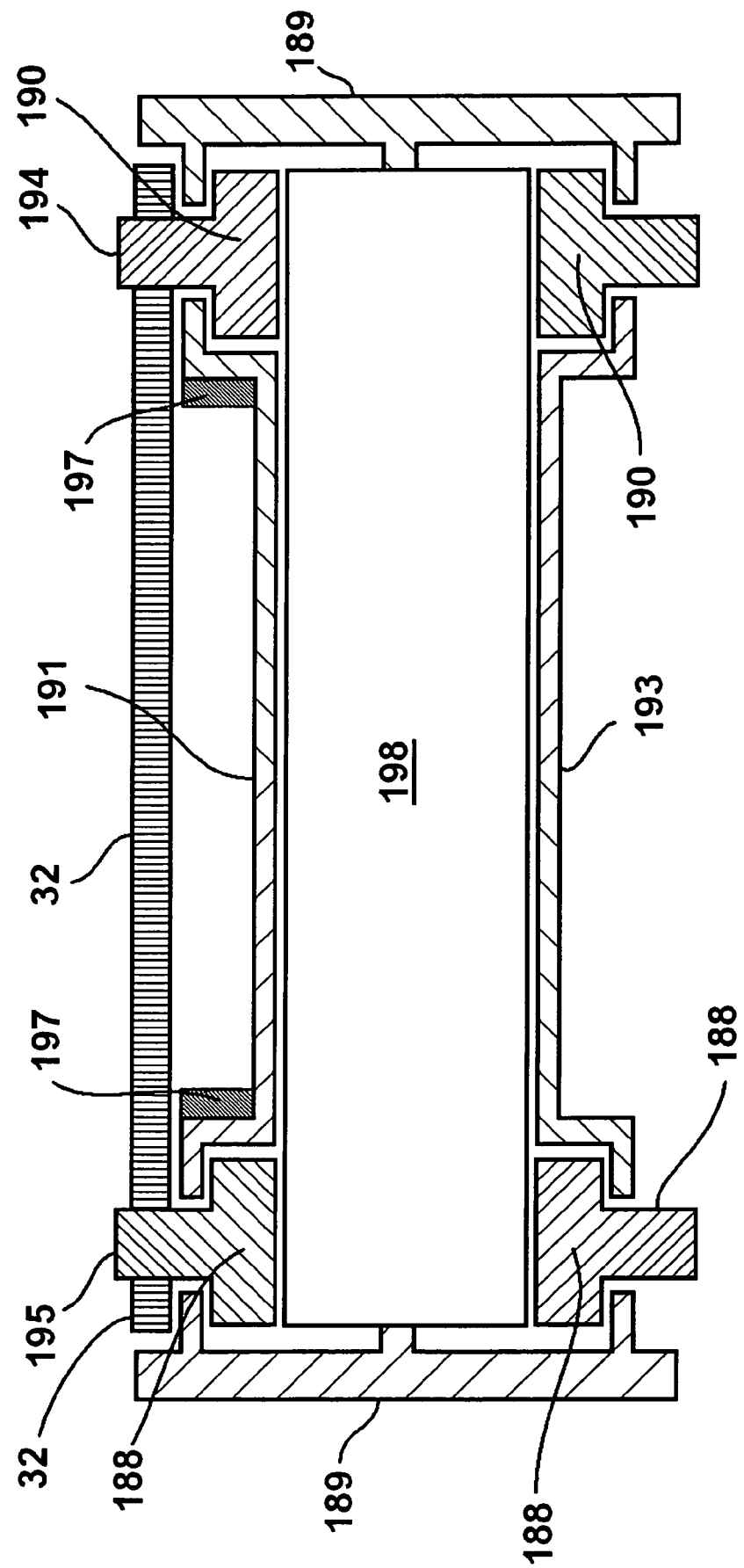

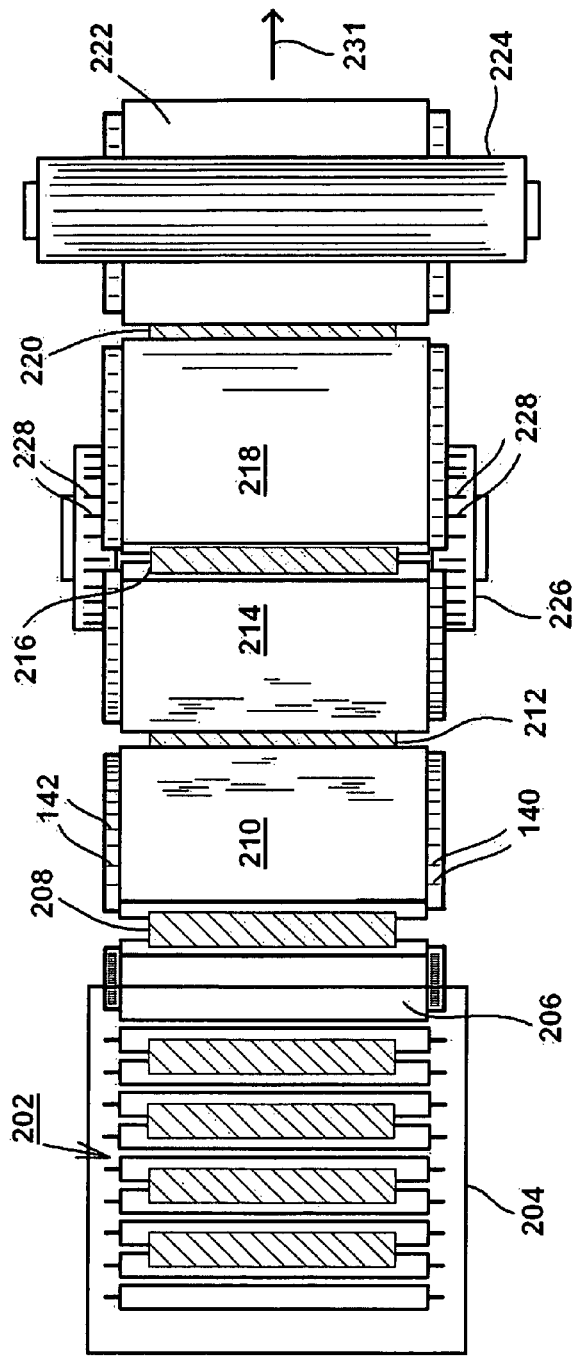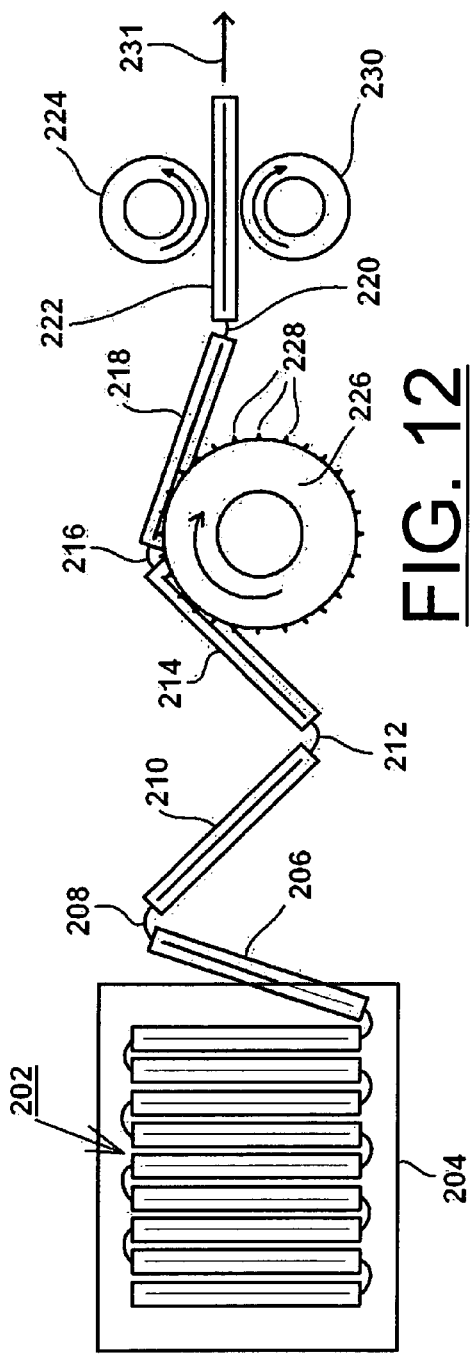

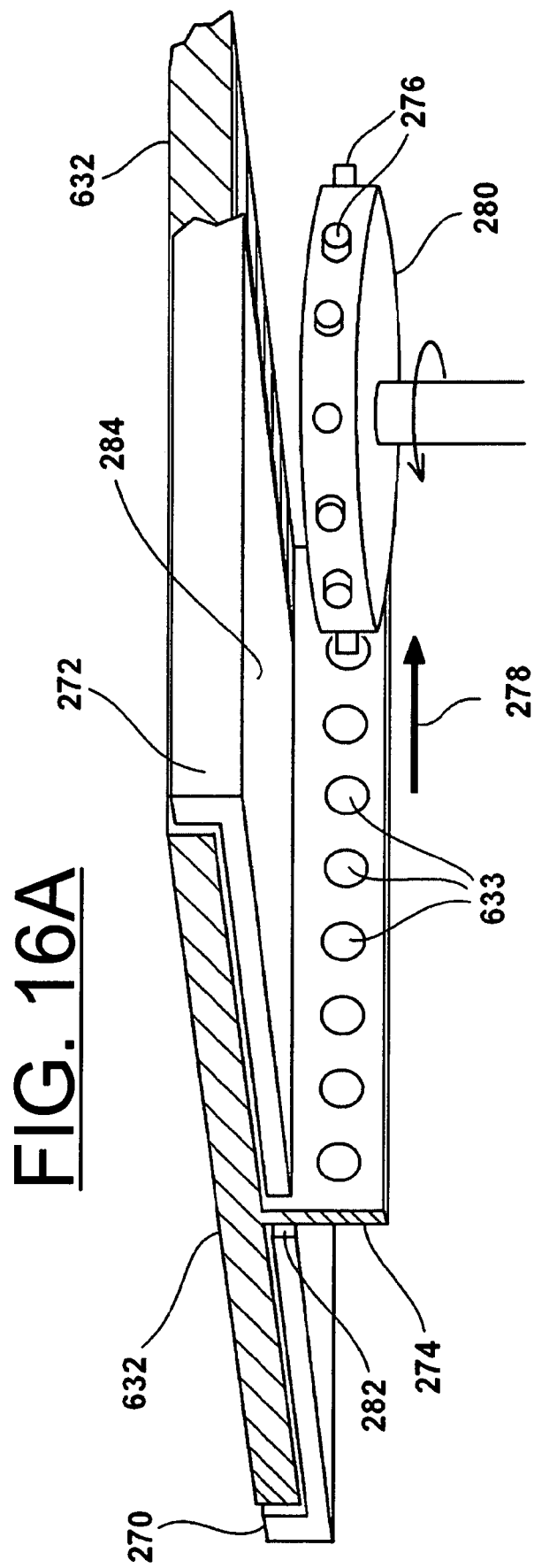

HIGH-SPEED DIGITAL SCANNER AND METHOD

This invention relates to digital scanners and methods of using the same, and particularly relates to the sequential scanning of image-bearing media such as photographs, business, playing, and sports cards, etc.

In the past, services and machines have been provided for the sequential digitization of numerous flat items of moderate or small-size, such as photographs, trading cards, etc. so as to convert the contents of photo albums, etc. into digital form.

The machines provided for this purpose include flatbed scanners which scan a single object placed on a plate manually and removed manually after scanning. Alternatively, multiple sheets, such as documents, drawings, photographs, etc. of a proper size can be fed automatically by means of a feeder which is part of the scanner so that a plurality of items can be digitized in sequence. Some such machines also serve as photocopiers.

Prior equipment also includes specialized photograph scanners which are specially adapted for feeding and digitizing stacks of rectilinear photographs and the like. The capacity of such feeders is relatively low, and the feeders are sensitive to adhesive on the photo, and sometimes jam, sometimes causing damage to the photos. Also, the feeders usually do not handle photos of different sizes within a single batch, and they usually do not handle non-rectilinear photos such as oval or other such shapes.

Photograph scanning services are provided by various business enterprises. Such services are often used for digitizing relatively large numbers of photographs or other similar objects, especially by people or businesses which do not wish to purchase a scanner.

A typical method of operation used by such scanning services includes requiring a customer to place his or her photographs to be digitized in one or more boxes and ship them to a processing center, usually by mail or other delivery service.

Such service organizations usually require that the photographs be sorted into different sizes, and that all extraneous matter, and particularly all adhesives, be cleaned off of the photographs before they are submitted. This preparation and packaging of the photos to be shipped to the processor usually is tedious and time-consuming, and it often is difficult to remove the adhesives.

When the service organization receives the photos to be digitized, it uses automatic feeder type scanners or flatbed scanners to digitize the photos.

Then, the organization stores the digitized photos in a memory device such as a CD ROM, DVD, memory stick, or other portable memory unit. The stored digitized images are returned to the customer, as well as the original photographs.

This prior service suffers from a number of problems.

First, the photos often must be sorted because, if the adhesive on the photos is not removed completely by the customer, the photographs with excessive adhesive must be removed and digitized by hand, using a flatbed scanner. Otherwise, the photographs will stick together when fed through a feeder-type scanner, causing misfeeds and/or missed photos. Also, non-rectilinear photos, or photos of different sizes may be mixed together when received from the customer.

The result of the foregoing is that the scanning process typically used by scanning service organizations usually is tedious, inefficient and labor-intensive. This tends to increase processing costs and slow down the processing time for each order, thus causing excessive charges, excessive delivery delays and customer unhappiness.

Moreover, as noted above, the shipping and preparation of the photos by the customer is slow and tedious, as well as difficult, especially when adhesive removal is required.

Another reason why the process is slowed when performed by a service provider is that most scanners with automatic feeders will be able to handle only relatively small batches of photographs, e.g. 25, 40 or somewhat more, so that operators then must frequently reload each scanner with another batch of photographs. Also, the machine must be watched to tell when the first batch has been processed, or if there is a misfeed. Because the scanners also are relatively slow, the labor costs are substantial.

Accordingly, it is an object of the invention to provide a digital scanner and method which overcomes or alleviates the foregoing problem.

In particular, it is an object of the invention to provide such a device and method in which the sorting and pre-handling of photos and other objects by customers of scanning services is reduced, and made easier for the customer to perform.

Another object is to provide a scanner and method in which items to be scanned are supplied and scanned rapidly and automatically in large numbers, when needed.

Another object is to provide such a device and method in which feeding is relatively jam-free and misfeeds are minimized.

It is a further object to provide such a device and method which is substantially faster than available in the prior art.

It is another object of the invention to provide a digitizing method which requires relatively less time and labor costs to process large quantities of photos or other objects.

A still further object is to provide a long-term storage device for storing the digitized photographs or other items by the customer after he or she receives their return.

It is a still further object of the invention to provide a relatively inexpensive and easy-to-use holder for holding objects to be scanned while they are being moved through the scanning equipment and thereby avoiding or minimizing misfeeds, reducing labor costs and speeding the digitizing process.

It is yet another object of the invention to provide a relatively inexpensive and easy-to-use holder for safely holding objects to be scanned while they are being transported to and from the scanning device.

In accordance with the present invention, the foregoing objects are met by the provision of a scanning support member in the form of an elongated belt having a plurality of pockets along the length thereof.

Each of the items to be scanned is inserted into one of the pockets, and the belt is fed through a scanning machine in which each of the pockets is moved past a target area where the photograph or other item is scanned and digitized. Each of the pockets has a transparent front surface which allows light to pass through for scanning the item in the pocket.

In use, the items to be scanned are inserted one by one into the pockets. The items need not be sorted by size, and the items need not have a rectilinear shape. If the item has a residue of foreign substances, such as adhesive, it will not cause the item to stick together with another item, or cause a misfeed or failed operation.

The belt with the filled pockets then is inserted into the scanner and the belt is fed through the scanner at a rapid speed. Preferably, the scanner works with a high speed camera and a stroboscopic light source so that the belt can move continuously through the target area of the scanner. Alternatively, the belt or a CCD or complementary metal-oxide-semiconductor (CMOS) array can be moved stepwise to scan each pocket. A digitized representation of the items in the pockets is stored in a storage unit. The digitized versions of the items are then processed and delivered to the customer, either by delivering a portable storage unit, or downloading to the customer's computer.

Advantageously, the scanned items may be left in the pockets and the belt may be accordion-folded or rolled up and used to conveniently store the items.

Preferably, the scanner includes software which can be used to effectively rotate a scanned image, if the position of the item in the pocket is skewed. Therefore, the item need not be stored with an accurately aligned image.

Further, advantageously, even odd-shaped photographs such as oval or other non-rectilinear shapes can be scanned without using a flatbed scanner by hand. The scanner's software is programmed to digitize only what it sees that is not background. The invention provides a neutral background surface, either as a back panel for each pocket, or a background on a plate in the target area of the scanner.

Advantageously, there is relatively little chance of jamming of the belt when moving through the scanner because the belt has flanges extending from one or both sides which can be gripped by drive wheels to move the belt through the scanner.

In one embodiment of the invention, each of the belts has one or more flanges which are either smooth or have tractor feed holes. A roller or a tractor feed mechanism is used to drive the belt through the scanner.

The belt can be made either of soft plastic or hard plastic pockets with flexible joints between adjacent pockets. In either event, the belt can be accordion-folded for compact storage while feeding or after feeding, or at any time when the belt is at rest, such as when used as permanent, compact storage for the photos or other items. Alternatively, the belt can be rolled into a roll for feeding or storage.

In one embodiment of the invention, a mark is placed on each of the pockets so that it can be used by the detector in the scanner, and the detector can signal the scanner mechanism to operate at the time when the contents of the pocket are positioned correctly in the target zone of the scanner. Alternatively, any feature of each pocket, such as its bottom edge, etc, can be detected to time the scanner.

It also is preferable that a mark be placed on each pocket in code so as to identify each pocket uniquely. This code can, for example, be a barcode, and the scanner can include a barcode reader.

Advantageously, the pocketed belt preferably is made suitable for long-term storage of photographs and other items to be digitized. Therefore, when the photographs, etc. are returned to the customer, they are still in the pockets in the belt, and can be stored exactly as they are, in accordion-fold form. Therefore, further handling of the original items after being digitized is minimized.

The invention can be commercialized in several different ways. First, the scanner and the pocketed belts can be sold to businesses, individuals, or government agencies, etc. for their own use on their own premises. Both the scanner and the belts can be sold separately. The belts can be sold for more purposes other than scanning, since they are adapted to store substantial quantities of photographs, etc. in a convenient, accordion-folded form.

In addition, or alternatively, scanners can be placed in a building accessible to the public, such as in department stores, drug stores, grocery stores, hardware stores, etc. where people come to buy a variety of products. Pocketed belts can be sold to a customer who wishes to use them at home to store articles, either in preparation for having them scanned, or otherwise.

When the customer has loaded the pockets with items to be scanned, he or she can bring the loaded belt to the same store to have it scanned. Advantageously, because the scanner is so fast, the customer may be able to wait for the digitized storage unit and the originals to be delivered to him or her. In fact, the customer can bring his photos, etc. to the store, obtain a belt, load it in the store, have it scanned and return home, thus, enjoying one stop processing.

If the stores or other publicly accessible buildings are numerous enough, communication by mail or UPS, FedEx, etc. may not be necessary. However, the scanner and belt of the present invention can be used by a service center which receives the loaded belts by mail, scans them and returns them and the digitized version to the customer. The customer first should purchase the belt from the service provider, either by mail or in person.

It is possible, of course, that all of the foregoing uses can be made of the invention simultaneously.

The foregoing features and advantages of the invention will be set forth or be apparent from the following description and drawings.

IN THE DRAWINGS

FIG. 1A is an enlarged schematic view of one embodiment of a pocket of the pocketed belt shown in FIG. 1;

FIG. 1C is a further schematic side elevation view of components of the device shown in FIG. 1;

FIG. 4 is a schematic block diagram of the electronic system used to control and operate the device in FIG. 1;

FIG. 5B is a partially schematic perspective view of a belt with pockets and an attachable track for use in the device of FIG. 1;

FIG. 6 is a partially schematic perspective view of another belt with pockets for use in the device in FIG. 1;

FIG. 7 is a schematic perspective view of yet another pocketed belt usable in the device in FIG. 1;

FIG. 8 is a top plan view, and FIG. 9 is a side elevation view of another belt with pockets usable in the device in FIG. 1;

FIGS. 10 and 10A are a perspective view, partially schematic, and a cross-sectional view of an advantageous tractor feed mechanism for use in the device of FIG. 1;

FIG. 11 is a top plan view, and FIG. 12 is a side elevation view of another pocketed belt and drive mechanism usable in the device in FIG. 1;

FIG. 16A is a partially schematic perspective view of a belt, track and drive mechanism for use with the device in FIG. 1;

GENERAL DESCRIPTION

Figure 1:
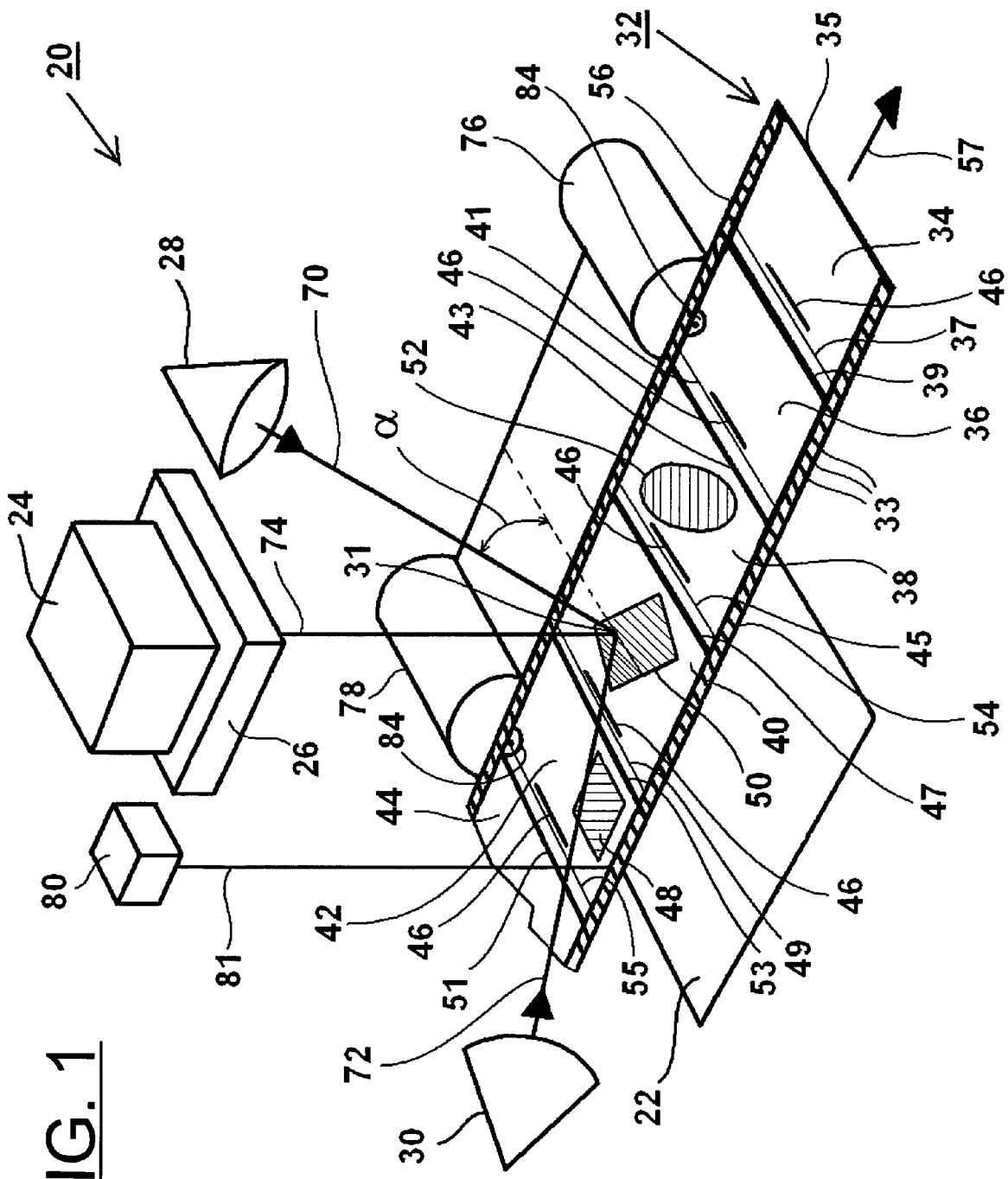
FIG. 1 is a schematic perspective view of a preferred embodiment of the invention.

FIG. 1 shows a scanner device 20 constructed with accordance with the present invention. The housing and much of the mechanical structure of the scanner is omitted from FIG. 1 in order to simplify the drawings and enable a clear description of the principles of the invention.

The scanner 20 includes a support plate 22, preferably colored with a uniform color such as green to provide a neutral background for viewing the items to be scanned.

The scanner 20 includes a digital camera 24, a polarizing filter 26 between the digital camera and the target area 31 at which it is aimed on the surface 22.

A pair of strobe lamps 28 and 30 are mounted to flash their strobe lights at an angle α with the plane of the surface 22, and are aimed at the target position 31. The two strobe lamps 28 and 30 are so positioned to deliver darkfield illumination at an angle α to minimize glare off the surface of the pocketed belt to be described below. Alternatively, a diffuse lighting array (such as a dome illuminator) and/or a polarizing filter 26 may be used to reduce glare off the surface of the pocketed belt.

In accordance with the present invention, a pocketed belt 32 is provided. Preferably, the belt is made of one or more flexible plastic sheets laminated together to form a series of pockets along the length of the belt.

In FIG. 1, five pockets 34, 36, 38, 40 and 42, and part of another pocket, 44, are shown, for the purposes of explanation. Actually, although the belt could be as short as the one shown in FIG. 1, the belt used normally would have many more pockets with objects to be scanned so as to take maximum advantage of the speed and productivity enabled by the technology of the invention.

Each pocket has a bottom edge 35, 39, 43, 47, 53 or 51 with a transparent front wall and back wall, with the edges fused together along both sides 54 and 56 of the belt.

Each pocket has an upper edge or lip 37, 41, 45, 49, or 55. As it will be shown in FIG. 5 and described below, each of the upper edges or lips can be bent outwardly to allow insertion of an object, preferably a flat article like a photograph, baseball card, or the like. Preferably, but optionally, there is provided an area 46 of contact adhesive, either on the inside surface of the rear wall, or on the inside surface of front wall, just below the lip. The contact adhesive is provided in order to seal each of the pockets to prevent its contents from accidently spilling out.

At least one, and optionally multiple motors, 76 and 78, are provided to engage at least one edge or both edges 54 and 56 of the belt to drive it forwardly in the direction of the arrow 57 to move the belt and the pockets past the target area 31 of the scanner. Alternative drive mechanisms are possible and further examples will be described herein.

Prior to feeding the belt 32 into the scanner, each of the pockets on the belt, with certain exceptions to be noted below, is loaded with a preferably flat article such as a photograph, etc. to be scanned by the scanner. These items to be scanned can be of a variety of different sizes, shapes and orientations.

As an example, pocket 42 contains a relatively small photograph 48 located towards one corner of the pocket.

Pocket 40 holds a rectangular photograph 50 which is badly skewed relative to the sides of the belt and the bottom edge 47 of the pocket.

Finally, in pocket 38 is an oval photograph 52 which also is skewed relative to the longitudinal axis of the belt 32 or the bottom edge 43 of the pocket.

Pockets 34 and 36, in this example, have been left empty purposely. This is to provide a certain length of belt material that can be gripped by motor 76 to pull it forward before actual scanning starts. This set of two pockets might be called a "lead end" section and can consist of as many pockets as necessary to serve the function.

Mounted on the support structure of the scanner (not shown) is an optical detector 80 which shines electromagnetic radiation (e.g. infrared beams) downwardly along a path 81 toward each of the pockets or the flange extending from the side of the pocket. Detectors 80 may be programmed to recognize any of a variety of indicia printed on or implanted into the borders of each pocket, and trigger the illumination system and/or the camera shutter based on the appearance of certain indicia.

As it will be explained below, in a preferred embodiment of the invention, each pocket (or belt section near the pocket) bears indicia that are detected by the detector 80 to time the flashing of the strobe lamps 28 and 30. This timing is set so that the center of each pocket is located at the target area 31 when the strobe lights 28 and 30 operate. When the strobe lights operate, the digital camera 24 takes a picture of the entire area of the pocket. However, the operating software for the camera and the scanner system differentiate the photo area from the background area seen through the transparent pocket walls to digitize only the area occupied by the photograph or other image to be digitized.

When the pocket is empty, as are pockets 34 and 36 shown in FIG. 1, the camera detects no photograph to be scanned, and does no digitizing.

Triggering System

FIG. 1A is a plan view of an individual belt section 69 having a transparent pocket 63 with upper lip 105 containing a flat-surfaced item 65, such as a hardcopy photograph. Cutaways of pockets 101 and 103 are shown connected to belt section 69 by thin connective strips 60 and 66, which may be made of thin, flexible plastic or similar material.

The pocket 63 has an entrance 105 and is bounded by a border zone 61. Several indicia are marked in the border zone 61 as examples of indicia which can be used to trigger the flash of the optical system, and for information storage and retrieval purposes. The indicia are a barcode 64, labels 62 and 97 bearing alphanumeric characters, and a set of coding marks 58 which can be marked to indicate the contents of the pocket, or for other purposes. In alternative embodiments, the transparent pocket 63 may cover both the item 65 and the border zone 61, extending across the entire area between edges 54 and 56. In further embodiments, there may be no border area 61 or indicia, with the pocket containing only an article 65 to be imaged.

The barcode 64, alphanumeric code 62, and the code marks 58 preferably are applied by printing them on the belt surface. The alphanumeric characters in the label 97 also can be printed, but the labels preferably are applied to the belt by a machine. The labels preferably carry human-readable unique identification information for the pocket 63. A separate label is provided for each pocket.

The detector 80 may be programmed to recognize certain indicia and activate the illumination system and/or the camera shutter when those indicia are detected. For example, a standard machine-readable barcode indicum 64 may be used to trigger the image acquisition system. Where detector 80 is an infra-red barcode reader, no visible light will be necessary to detect barcode 64, thus minimizing the risk that unwanted visible light will enter the camera's field of vision.

Also, the barcode 64 can store information unique to the images in the pocket 63. One such item of information is the unique identification for the photo or other item 65 in the pocket. Another type of information which can be stored in the barcode is instructions for processing the item to be digitized in the pocket 63.

The alphanumeric characters in the labels 62 and 97 may be recognized by the camera system and reproduced in the scanner's computer as a file name for the digital image, and they can be read by the user of the scanner or the owner of the images to be scanned.

The code circles 58 are labeled "A," "B," "C," "D." Circle A has been colored by use of a pen by an operator or a user to indicate that the contents of the pocket 63 are in the category "A." Similarly, other circles can be colored by the means of a pen or the like to indicate other characteristics of the images being digitized. The scanner computer's system then can sort the images into different groups corresponding to the coded areas. Then, the resultant files and folders can be named according to the user's preferences. In this way, the user or system operator can identify multiple images in the various pockets which should be grouped together because of having common subject matter.

As it will be apparent to those skilled in the art, the various coded indicia may be applied to the pockets in the pocketed belt at a variety of different times dependent upon the information contained in the indicia.

For example, if the bar code 64 is merely used to number and uniquely identify each pocket, as well as triggering the flash, the bar code can be printed in advance of the pockets being filled. Alphanumeric characters 62 may also be applied in advance of the pockets being filled for the purpose of uniquely identifying each pocket. Similarly, the transparent circles 58 can be printed in advance.

The label 62 typically will be applied as a part of the digital processing of the images on the belt just prior to digitization, in the system shown in FIG. 1.

In certain embodiments, filament 67 at the leading edge of the belt section 69 may serve as a trigger. Filament 67 may consist of a painted line capable of detection by detector 80 in much the same way as detector 80 might detect barcode 64. Although a light beam detector, such as an infrared detector, is preferred for detecting triggering indicia on the pockets, the triggering strips 67 alternatively can be upstanding ridges formed in the belt material which can be used to actuate micro-switches or other mechanical sensors to perform the triggering action.

Alternatively, filament 67 may be made of a metal, magnetic, or electromagnetic-radiating/reflective filament capable of detection by detector 80. For example, filament 67 might consist of a thin thread of magnetized metal capable of triggering a magnetic detector or metal detector as belt 69 is pulled through the scanner.

As another alternative, the detector's triggering signal may be timed such that the illumination system and/or camera shutter will be activated at the moment that the center of the pocket reaches the target area 31 shown in FIG. 1.

FIG. 1C depicts how the triggering system may operate based on the position of the belt 532. FIG. 1C shows a belt 532 consisting of pockets 302, 304 and 306 connected by connector strips 308 and 310. Belt 532 is moving to the right under the camera and illumination system 300 as shown by arrow 322.

Detector 80 is shown at a position two pockets in front of the camera and illumination system 300. If detector 80 requires visible light to operate, positioning the detector 80 away from the camera may be necessary to eliminate unwanted visible light from the camera's field of vision. In this embodiment, when detector 80 visually detects indicum 312 on pocket 302, it instantly sends a signal to the camera and illumination system 300 to trigger either the camera shutter or the illumination system in order to capture a digital image of pocket 306. Because the triggering system just described uses the position of one pocket to trigger a photograph of a different pocket, this embodiment requires each pocket on belt 532 to be equal in size and spaced at equal intervals.

Alternatively, when the detector operates based on a trigger other than visible light (such as infra red or magnetic field detection, for example), the detector may be placed adjacent to or within the camera and illumination system 300, as shown in FIG. 1C by detector 80A. In this embodiment, when detector 80A detects indicum 316 on pocket 306, it instantly sends a signal to the camera and illumination system 300 to trigger either the camera shutter or the illumination system in order to capture a digital image of pocket 306.

Although it is preferred that triggering indicia be used to trigger the flash system, it is within the scope of the invention to leave the pocket and its surrounding areas clear of any markings and time the flash by other alternatives described below.

When detector 80 is positioned forward of the camera and illumination 300 as shown in FIG. 1C, the detector 80 triggering signal may be time-delayed such that the illumination system and/or camera shutter will activate at the moment the center of the pocket reaches the target area 531. Similarly, if the drive system is reliable enough to drive the belt at a very consistent speed, a detector can be used to measure the speed at which the belt is moving and time when the first pocket is detected to calculate the arrival time of the center of each pocket at the target area 531. Timing may also be achieved by calculating position based on a pre-programmed belt speed.

Computer Image Enhancement

Digital image enhancement and processing software are well-known in the art, and may be used to enhance digital data representing images scanned by the scanner.

One enhancement produced by such software is to detect the proper orientation of an image and correct for any skew. Therefore, referring again to FIG. 1, the photo 50, which is badly skewed can be, in effect, rotated by such software so that when the digital data representing the image is displayed on a screen, the photograph is aligned correctly. Similarly, the oval photograph 52 in pocket 38 can be detected by other software so that the software can analyze the proper position of the images in the photograph and modify the data to align them correctly.

Also, the three photographs, 48, 50, and 52 in FIG. 1 all are of different sizes and are located in different areas of the pocket. This shows one of the advantages of the invention in that objects of varying sizes can be scanned easily and quickly regardless of their size, shape or orientation in the pocket. This compares most favorably with feeder-type photo scanners, in which it is usually required that all of the photos being fed into the machine be of the same size and of a rectilinear shape.

Image processing software which is readily available also can be used to enhance the pixel resolution, correct image defects, and otherwise manipulate the digital image to produce an improved image when the data is reproduced. Such software is currently employed, for example, by Adobe Photoshop and Google Picasa.

Pocket Identification System

Referring again to FIG. 1A, once a digital image is taken of the belt section 69, the scanner's software can employ optical recognition technology to gather identifying information from the various indicia 58, 62, 64, 97 and any other indicia placed on the border zone 61. This identifying information may be used by the scanner's computer system to classify the contents of the pocket 63.

For example, an operator might create a barcode label 64 which uniquely identifies pocket 63 and/or contains instructions about how the digital image is to be processed. A label 62 applied by the manufacturer of belt 69 may also serve to uniquely identify pocket 63, and may be read both by a computer and a human operator.

The person seeking to use the scanner may also choose to apply their own label 97 to the border zone 61 to identify the contents of pocket 63. For example, when item 65 is a photograph, the user might use label 97 to identify the name of the place where the photograph was taken. Any user-applied labeling should preferably have clearly-readable text (preferably machine-printed) so that the scanner's computer can easily employ optical character recognition. Any user-applied labeling such as label 97 should be flush with the surface of the belt 69 to avoid interference with the smooth conveyance of the belt 69 through the scanner.

A user might also use a writing instrument such as a permanent marker to shade one of the bubbles 58 to identify the contents of the pocket 63. Next to each bubble 58 is an identifying indicia, such as a alphanumeric character, which is printed on the border zone 61 by the manufacturer of the belt 69. The user can shade a bubble 58 next to a given alphanumeric character to identify the contents of the pocket. For example, the user might shade the bubble 58 next to the character "A" as shown in FIG. 1A.

After the scanner takes a digital image of belt section 69, it will recognize the shading and associate the digital image file with the identifying data "A." In this manner, the label "A" remains associated with the digital image. For example, the file folder where the digital image is stored may be given the folder name "A." The user can then change the folder or file name to have a more detailed meaning. For example, if the item 65 was a photograph taken at location X at time Y, the user might change the folder or filename from "A" to "X, Y."

Border zone 61 and the back panel of pocket 63 may possess a neutral color—such as green—which the scanner's digital image processing software can recognize and subtract from the final digital image, leaving only an image of item 65. Alternatively, belt 69 may pass over a neutral-colored support plate 22, and the border zone 61 and back panel of pocket 63 may be transparent so as to take on the neutral color of the support plate 22 and allow for digital subtraction.

Digital subtraction of neutral backgrounds is well-known in the art, and any number of commercially available software programs can perform the technique. When subtracting the border zone 61, the scanner's software can also subtract the digital image of the indicia.

Figure 4A:
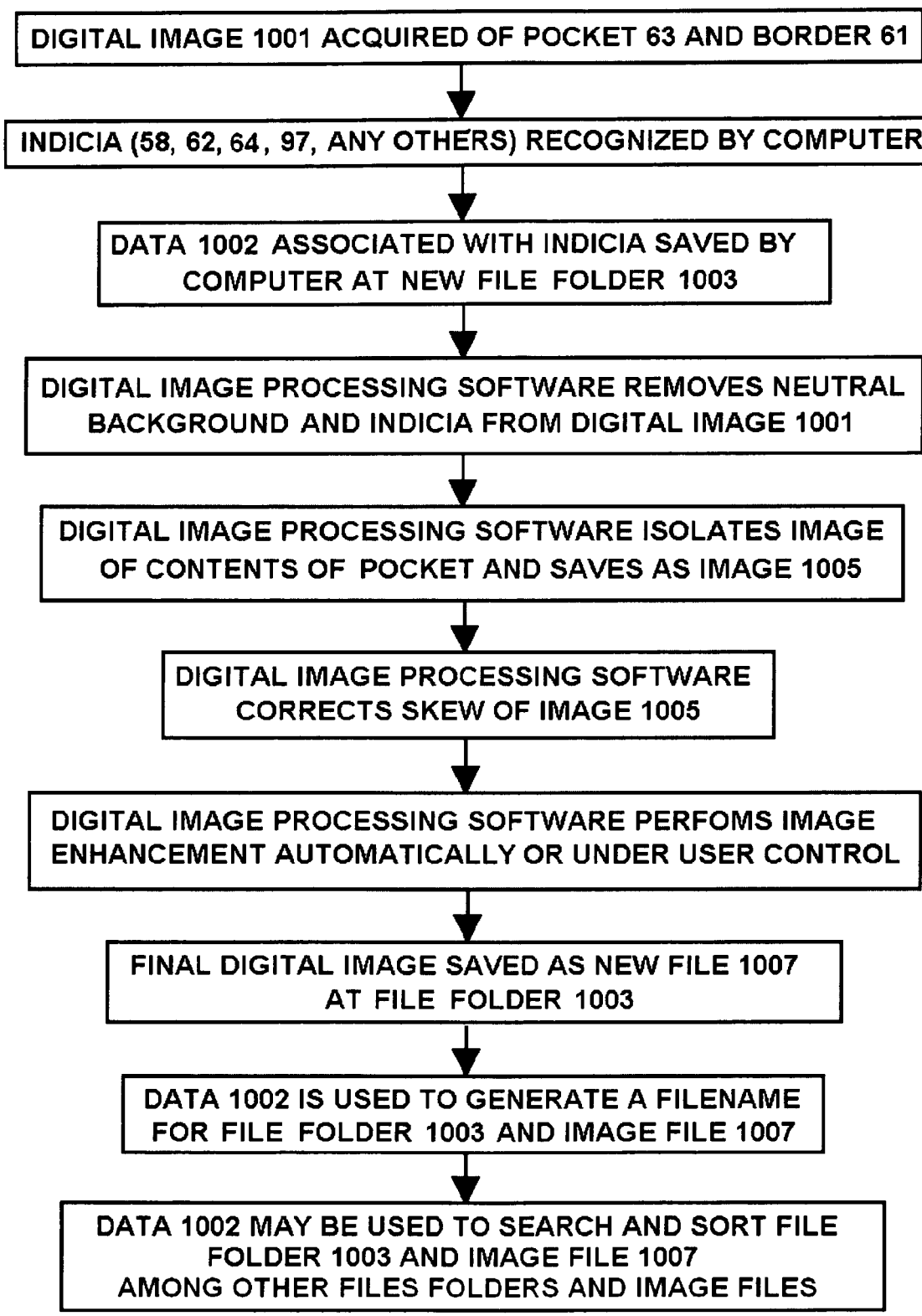
FIG. 4A is a flow chart showing the processing steps used in one embodiment of the invention.

FIG. 4A is a diagram depicting the basics steps involved in processing a digital image 1001 of pocket 63 and border zone 61 having indicia 58, 62, 64, 97 and any other indicia that may be placed on border zone 61. As shown in FIG. 4A, the data 1002 associated with the indicia is recognized by the computer. The scanner's computer system can then group digital images according to the indicia data 1002, and the resultant computer files and folders can be named according to the user's preferences. In this fashion, the user can, for example, identify certain pockets within a belt as containing items relating to a certain subject matter, and other pockets as containing items relating to a different subject matter. The identifying information 1002 can be used to search and sort a multiplicity of image files.

Many sophisticated digital image processing software programs are commercially available. Adobe Photoshop and Google Picasa, for example, are frequently used by novices and professionals to edit digital images. Digital image processing software is capable of subtracting neutral backgrounds, correcting skew, enhancing image quality and, in some cases, can even recognize specific landscapes and people in photographs.

Control System

FIG. 4 is a schematic circuit diagram illustrating the operation of the scanner. There are digitized output signals from the camera for each pocket containing an object to be digitized. Those signals are sent to a programmed computer or other CPU-containing processor 98 which performs various processing steps to be described below, and delivers the digitized images to a portable storage unit 104 such as a CD-ROM, a DVD, a memory stick, or other device for storage of digital data usable in a computer to reproduce the digitized pictures visually, on a computer screen, for example.

Alternatively, the signals are sent over the world-wide web 106 to download them to the computer of the customer, if this is preferred by the customer. The device 98 shown in FIG. 4 shown as a personal computer with a screen 100 and a keyboard 102, in order to provide visible pictures corresponding to the digitized data being produced by the scanner, and to perform other functions as necessary. The unit 98 also is programmed to operate the drive motors 76 and 78 whose movements are detected by detectors 108 and 110 to supply signals indicating the current position of each drive motor rotor.

The detector 80 is shown delivering an output signal to the strobe controller 29, which in turn controls the strobe lamps 28 and 30. Detector 80 may also control camera 24, if it is desired to trigger the camera shutter upon detection of the trigger indicium on each pocket.

Preferably, however, the camera shutter is open constantly whenever the scanner is turned on, but the camera is kept in the dark inside the cabinet of the scanner until the flash of the strobe light occurs. The light reflected from the object in the pocket which is being scanned is delivered upwardly in the direction of the line 74 into the camera 24.

In effect, this strobing action stops the movement of the object being digitized so that it and the belt can be moved continuously at a relatively high rate of speed while simultaneously being imaged by the camera.

The information stored for each image preferably includes the indicia assigned and marked on each pocket. Thus, the digital representation of the image is stored together with information indicating the location of the original in a specific pocket on the belt. Of course, an additional indicium can be presented in the first one or two pocket areas to identify the belt uniquely, and this information can be stored with the specific location on the belt, closely adjacent to each digitized representation of an image scanned.

Although FIG. 1 discloses a camera with a CCD array or CMOS detector sufficient to record a picture of the item in the pocket in one step, other scanning operations are possible, either to save cost, or for other purposes.

For example, it is believed to be possible to drive the belt with a stop-start (intermittent) motion to scan the pockets past a stationary array. Alternatively, a CCD array or CMOS detector and an ordinary exposure lamp, as commonly used in available scanners, can be driven intermittently to scan each pocket while it is stationary. As it is well-known, stepping motors can be used to create such motion.

Thus, although the high speed of the continuous motion of the preferred embodiment is preferred, the pocketed belt is highly advantageous to use even with a more conventional, lower cost scanner.

Illumination System

Figure 1B:
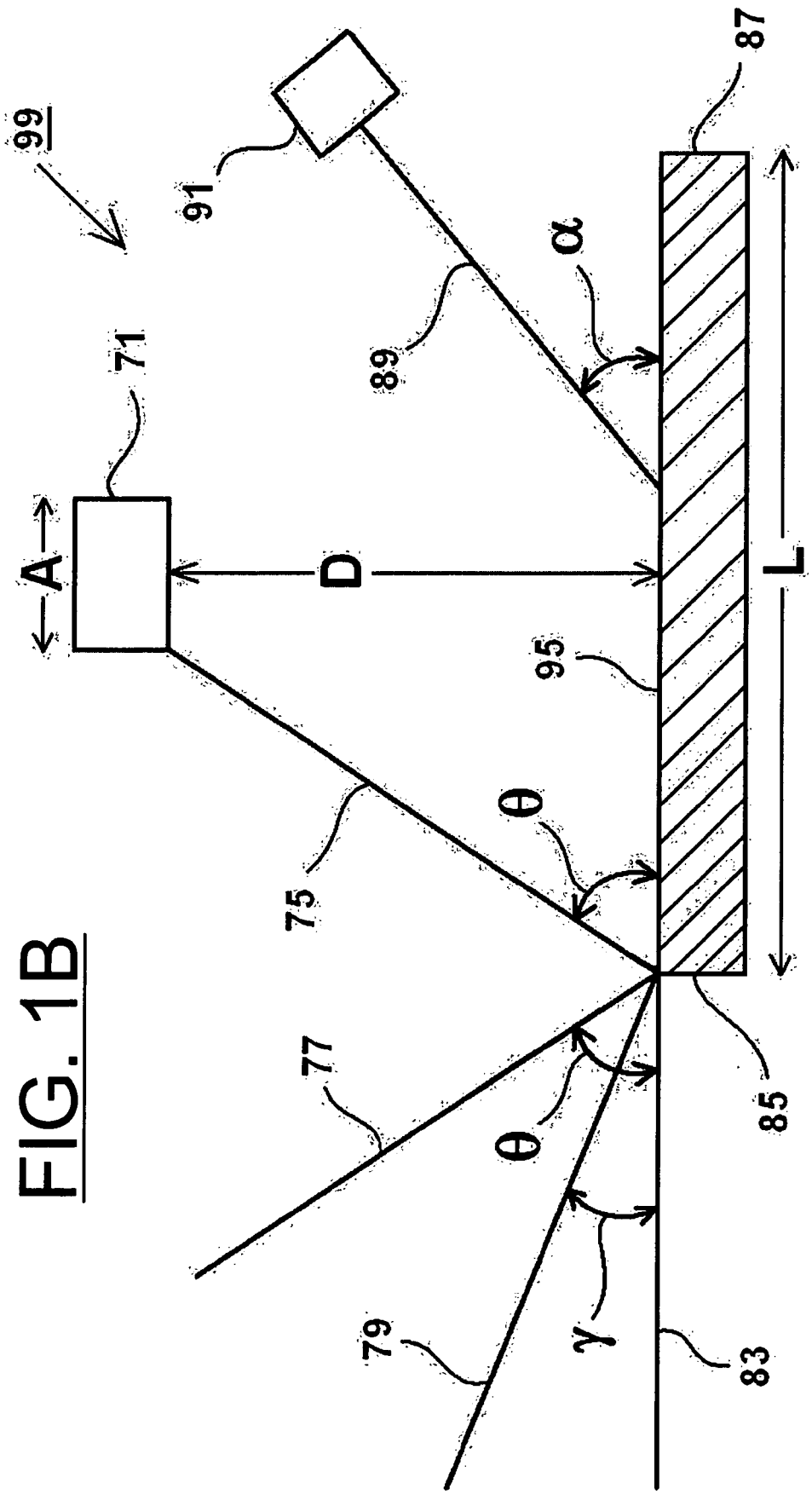
FIG. 1B is a schematic side elevation view of components of the device shown in FIG. 1.

FIG. 1B is a schematic diagram showing an illumination system 99 with a pocket 95 being imaged by a digital camera with an aperture 71. The pocket 95 has a length L with ends 85 and 87. The pocket is distance D below the camera aperture 71. The camera aperture 71 has a width A. Imaginary lines 75 and 77 make an angle θ with the plane of the pocket. Light emitter 91 emits light directed at angle α relative to the plane of the pocket 95.

In a preferred embodiment, light emitter 91 is a high speed strobe light. Such strobes are often sold as ring lamps with an open center encircling the camera though linear or square light arrays can also be employed. A strobe controller system 29 is used to trigger the strobe flashes, and may be connected to a detector 80 which provides triggering instructions to the strobe controller.

The advantage of strobe illumination is that it can "freeze" the movement of the pocket 95 so that the pocket can be moved continuously at a relatively high rate of speed while the camera captures what appear to be still images without motion blur. Dynamic motion strobe photography was pioneered in the 1930s by inventor Harold Edgerton, and the technique is commonly used in machine vision inspection of manufacturing assembly lines, as well as in scientific and military experiments.

To avoid glare reflected from the top surface of the pocket into the camera, angle α must be less than angle θ. In the science of inspection illumination, light directed at a surface at an angle greater than θ is called brightfield illumination, and light striking the inspection surface at an angle greater than θ will be reflected back up into the camera. By contrast, light striking the inspection surface at an angle less than θ is called darkfield illumination, and will not be reflected back up to the camera.

Darkfield illumination is well known in the art and a wide variety of darkfield lighting devices are commercially available. Some of the light emitted from the darkfield lighting array will scatter from the object being imaged, allowing the camera to expose an image (as shown by light 74 in FIG. 1), but glare will be largely eliminated. In a preferred embodiment, the illumination system 99 is enclosed in a darkened environment within the scanning machine to avoid extraneous brightfield lighting from the surrounding environment.

If angle α is very low, the resultant lighting is called low angle darkfield illumination. Low angle darkfield illumination is represented by angle γ in FIG. 1B. Low angle darkfield illumination is commonly used to accentuate defects or imperfections in a flat surface. For example, low angle darkfield illumination might highlight a scratch in the surface of the pocket. Thus, low angle darkfield illumination would be less desirable for use with the present invention than a higher angle darkfield illumination. Angle γ therefore represents a lower limit of acceptable values of angle α. The appropriate illumination angle α can be represented by the following equation:

$$\gamma < \alpha < \theta$$

The precise values of θ, α and γ vary with the length L of the pocket 95 under inspection, the width A of the camera aperture 71, and the distance D between the pocket 95 and the camera aperture 71. Angle θ can be readily calculated once parameters L, D and A are know. Those skilled in the art will readily be able to ascertain acceptable values of α such that brightfield glare is minimized and unwanted low angle darkfield lighting effects are minimized. This can be done, for example, by taking a series of test images and identifying the lighting angle α which provides the clearest image of the article contained within the pocket. As a practical matter, setting α at 45 degrees should yield satisfactory results in most circumstances.

It is believed that while darkfield illumination provides a satisfactory solution to the problem of reflective glare, an acceptable alternative to darkfield illumination is diffuse or dome illumination. Diffuse illumination is scattered light that strikes the surface of the object being photographed at a multiplicity of angles, thus minimizing reflective glare associated with directional lighting. Diffuse lighting essentially mimics the effect of lighting on a cloudy day, minimizing directional lighting and illuminating objects evenly.

A dome illuminator is particularly effective at creating diffuse lighting. A dome illuminator consists of a hollow hemisphere with a lit inner surface and an opening at its apex to accommodate a camera. The object being photographed sits at the base of the dome and is bombarded by diffuse lighting from all sides, minimizing reflective glare back into the camera. A diffuse illumination system or domed illumination system may be strobed by a strobe controller at a rate set by the user or triggered by a detector.

Darkfield, diffuse, and dome illumination systems are commercially available in a wide range of sizes, configurations, and light intensities. For example, a darkfield illumination system may consist of a single, angled linear array; a polygon configuration of angled, linear arrays; or a ring lamp having angled light emitters. Dome illuminators are available in a wide range of diameters and light intensities. Other diffuse lighting systems come in the form of flat plate with a central hole to accommodate a camera. The light emission profile of the illumination system should be optimized for full visible wavelength illumination (rather than for only one color, or for non-visible radiation).

The particular illumination hardware chosen will also vary based on the size of the objects being imaged and the quality of the transparent material making up the pocket. For example, a small object within a thin transparent pocket will require a smaller illumination system with less luminosity than a large object enclosed within a thicker transparent pocket. One skilled in the art of illumination will be able to identify the most appropriate illumination system, or have one custom-built, as is often done in the field of machine vision inspection systems. Experienced illumination hardware companies such as Advanced Illumination, Inc. can be readily consulted on lighting options and selection.

Digital Camera

High speed digital cameras are able to expose images very rapidly, and are capable of taking multiple images per second.

Modern high speed cameras typically employ either a Charge Coupled Device (CCD) array, or other active pixel sensor (APS) technology such as a Complementary Metal Oxide Semiconductor (CMOS) detector. Relevant camera specifications include frame rate (measured in framers per second (fps)), ability to detect color, and image resolution (measured in pixel count). Image resolution is usually inversely related to frame rate.

It is possible to operate the present invention using a high speed video camera. For example, the company Vision Research manufactures a high speed video camera that is capable of 4096×2440 resolution at 141 fps. A high speed video camera could be left on under constant light without the need for strobing illumination or timed camera firing. However, high speed video cameras typically take many more images per second than necessary, and storing unnecessary digital images consumes computer memory. Thus, though it is possible to operate the present invention using a high speed video camera, it is preferred to employ a high speed camera which operates at a lower frame rate and which employs strobe illumination to capture a single image of each pocket. For example, the company JAI manufactures a camera which is capable of 2456×2058 color image resolution at 15 fps, and a camera which is capable of 4872×3248 color image resolution at 3 fps. Numerous other high speed camera manufacturers exist, and it is believed that high speed cameras meeting any number of specifications are commercially available or capable of being manufactured.

It is believed that the present invention could be useful even if operated at a relatively slow speed of 1 fps, but the potential of the invention will be realized by operating at multiple frames per second. The durability of the belt and pockets—not the camera frame rate capabilities—will ultimately dictate how fast the invention can operate without destroying the belt or the contents of the pockets. If the belt is made of a durable plastic material and the contents of the pouches are flat and lightweight, it is believed that the invention can take images of tens of pouches per second. If the belt or its contents are more delicate or bulky, frame rates closer to 1 fps may be more appropriate.

Drive Mechanism

Figure 2:
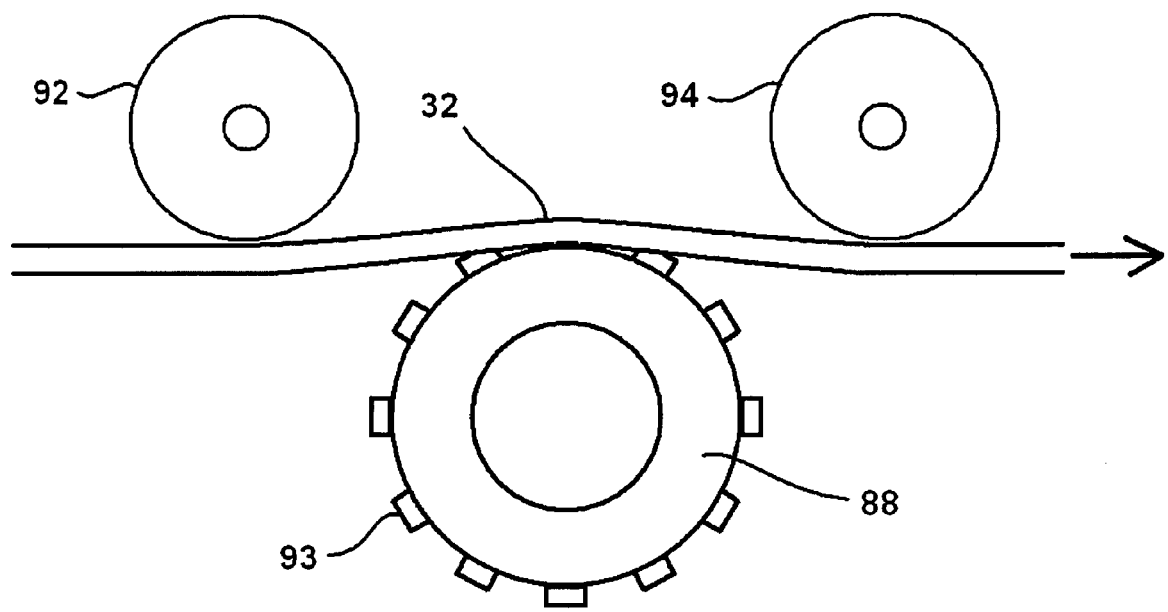
FIG. 2 is a schematic side-elevation view showing one form of drive roller mechanism used in the device shown in FIG. 1.

The belt 32 shown in FIG. 1 has a row of slits or holes 33 along each of its opposite edges 54 and 56. The provision of these holes is optional, and is for the purpose of enabling tractor feeding of the belt through the scanner as shown in FIG. 2. Alternatively, the two flanges where the slits 33 are located can be left solid without any slits or holes and the drive mechanism such as that shown in FIG. 3 can grip one or both of these edges to move the belt through the scanner.

It should be understood that various guides will be provided in the scanner for guiding the belt 32 into and through the scanner. Furthermore, various means will be provided to ensure that the upper surface of the pockets are flat and smooth so as to avoid distortion or other reduction of the quality of the scanning produced.

FIG. 2 shows, schematically, a simple tractor feed mechanism which might be used together with a drive wheel 88 with teeth 93 shaped and sized to fit into the holes 33 in the flanges of the belt.

A pair of idler rollers 92 and 94 are positioned, one before and one after the toothed drive wheel 88. The idlers 92 and 94 preferably press downwardly on the belt 32 so as to bend it slightly around the circumference of the drive wheel 88 so as to provide increased gripping of the drive wheel and more positive feeding.

Other advantageous tractor feed mechanisms will be described in detail below.

Figure 3:
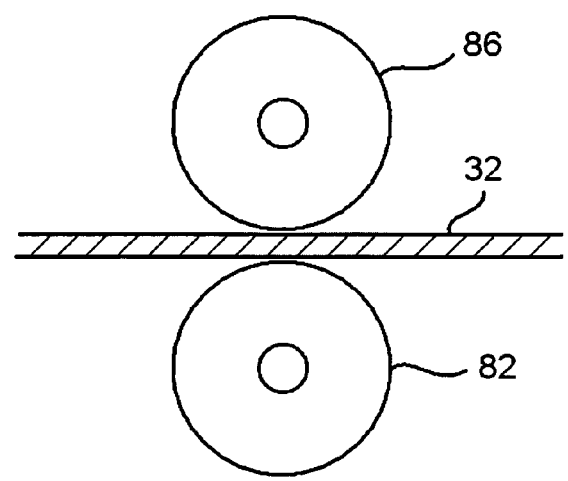
FIG. 3 is a schematic side-elevation view of another drive roller structure usable in the device of FIG. 1.

FIG. 3 is a schematic view of a rubber drive wheel 82 engaging the flanged edge of the belt 32 and pressing it against an idler roller 86 to grip the belt and pull it along. If this drive mechanism is used at both edges or only one edge of the belt 32, the tractor holes 33 need not be used. This can reduce the cost of manufacturing the belt, and reduce the complexity of the drive system.

It is desired to maintain a certain level of tension in the belt as it passes through the scanner 20. This is to keep the front walls of the pockets as taut and smooth as possible to avoid unwanted light scatter and glare on the surface of the pockets that will reduce the quality of the scanned images.

Longitudinal tension can be maintained with the use of only one drive motor 76 together with a frictional brake, guides, or other means upstream from the target area for lightly resisting the movement of the belt.

A better system uses both drive motors 74 and 76 and a servo loop to maintain the desired degree of tension.

An advantage of the use of the detector 80 to detect any indicia on each pocket for starting the scanning operation is that, if there is slippage in the drive system, the strobe lamps will not flash until the slippage stops and the pocket moves to the target location.

Alternative means can be used to time the flashing of the strobe lamps 28 and 30. For example, instead of using one of the indicia marked on the outside of the pocket, the bottom edges such as the edges 47, 49, etc. can be detected instead.

Alternatively, if the feed mechanism produces no slippage, then the operation of the strobe lamps can be set for a fixed time after the detection of each bottom edge of each pocket.

Other means can be used for timing the flash of the strobe lamps as it is well-known in the field of machine vision technology.

Belt Construction

Figure 5:
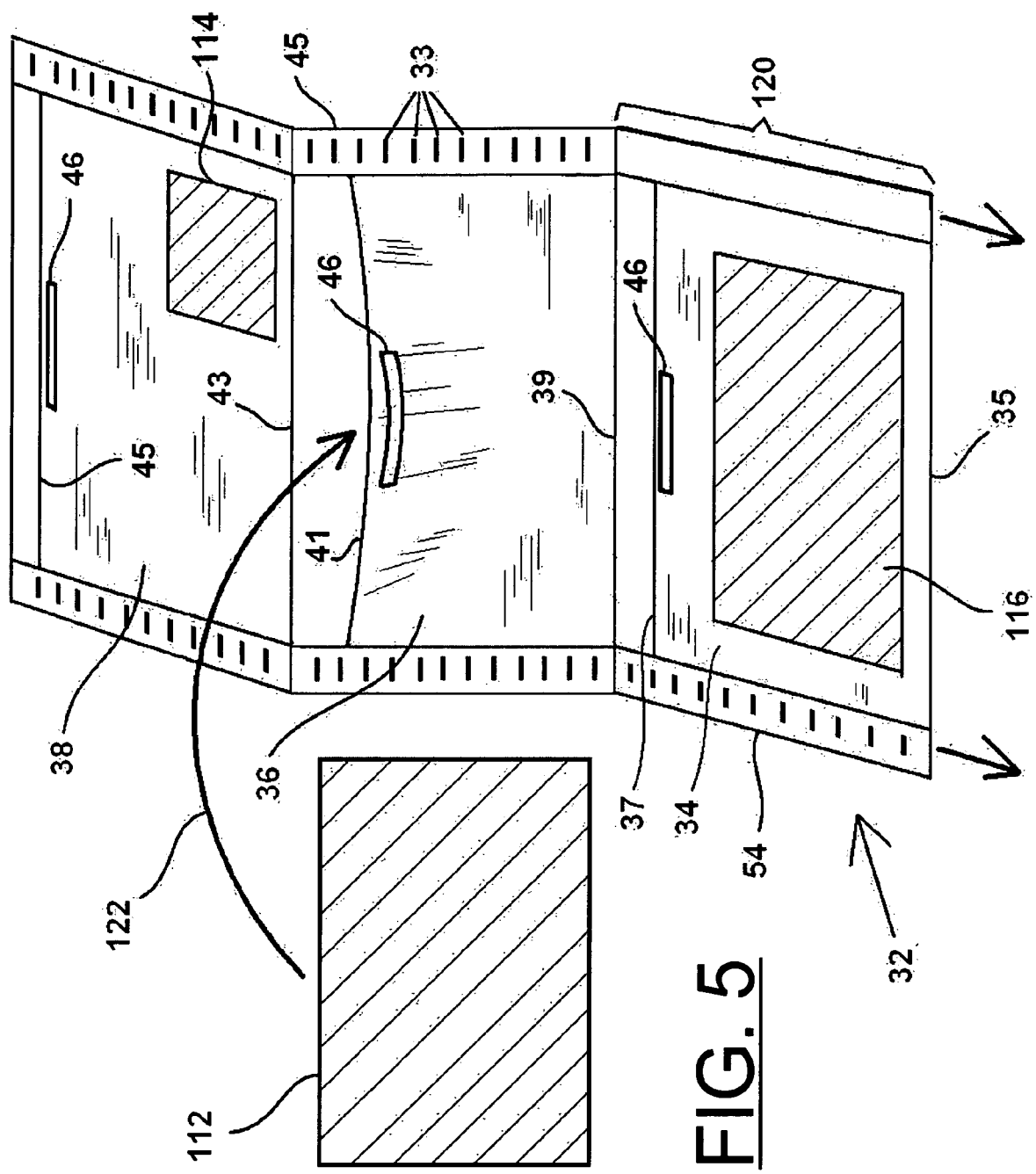
FIG. 5 is a partially schematic perspective view of a belt with pockets for use in the device of FIG. 1.

FIG. 5 is an enlarged perspective and schematic view of the belt 32 shown in FIG. 1. Each bottom edge 35, 39 and 43 of each of the pockets 34, 36 and 38 is made to form a fold-line so that the pockets can be folded one upon another in accordion-fashion for compact storage, both before and after scanning, or simply for storage purposes alone.

A small photograph 114 is positioned in the envelope 38 and a larger photograph 116 in pocket 34. Another photo 112 is shown ready for insertion into pocket 38, whose upper edge 41 is folded outwardly, to receive the photograph 112.

As stated before, the adhesive patches 46 for closing the pocket are optional.

In an alternative embodiment, a lamination technique such as heated pressure lamination or adhesive lamination may be employed to seal the edges of a pocket after an item has been loaded. The laminated edges may later be cut off to release the item within the pocket. At the operator's election, the pouches may also be permanently laminated in their entirety for permanent storage of the enclosed item. Certain lamination plastics have a heat-activated adhesive layer, while other plastic materials are capable of being fused by heat and pressure without the need for additional adhesive. Many lamination plastics are commercially available with cold pressure-activated adhesive, eliminating the need to apply heat.

In the section 120, the right hand border of the pocket 34 is shown without sprocket holes so as to illustrate the optional feature of using flanges without any holes.

The belt 32 preferably is made of flexible transparent film or sheet plastic material. Many kinds of plastics can be adapted for use with the present invention. For example, poly (methyl methacrylate) or polycarbonate thermoplastic are suitable for rigid, transparent panels. Polyethylene terephthalate is also frequently used for durable transparent containers. Polyvinyl chloride, low-density polyethylene, biaxially oriented polypropylene and nylon are examples of plastics commonly used for bendable transparent sheeting. The flexibility of many of these plastics depends on their thickness.

Additionally, polytetrafluoroethylene may be applied as a coating to the belt or the surfaces of the scanner contacting the belt to reduce friction to allow the belt to slide through the scanner more easily, especially at points where the belt is passed along a flat guide track. It is believed that the belt with pockets can be formed relatively inexpensively by standard heat-fusing and slitting techniques. By making the plastic sheets of which the pocketed belt 32 is made relatively thin, the pockets need not be much thicker than the photos or other objects in the pockets. This allows the accordion-folded stack of pockets with items for scanning in them to be relatively compact and lightweight.

Preferably, the bottom edges of the pockets in FIGS. 1 and 5 are heat-fused and serve as fold lines to promote accordion folding of the belt 32.

The belt 32 shown in FIG. 1 also represents a further embodiment of the invention in which the belt with pockets as shown in FIG. 5 is laminated by heat-rolling the pockets after they are filled with image-bearing media.

This embodiment has the advantage of permanently smoothing the front surface of each pocket, and preventing wrinkling or other distortion of the front walls of the pockets, thus helping to insure that the images in the pockets are transmitted to the camera 24 with little or no distortion.

Lamination can be used if the customer is willing to have the original items encased in plastic laminations. Lamination usually will be provided by the scanning service or organization, but can be performed by any user who has a lamination facility available.

Figure 5A:
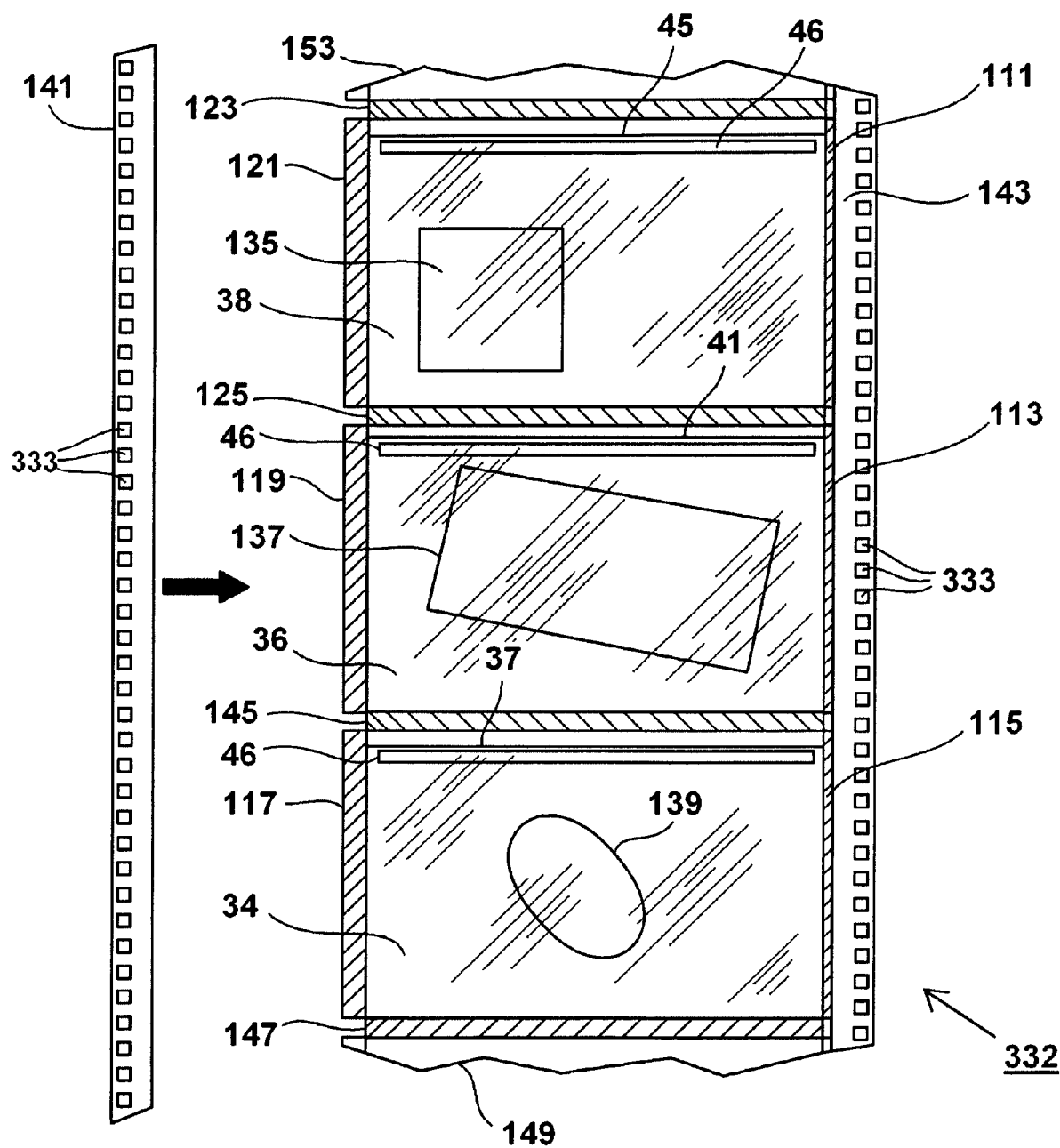
FIG. 5A is a partially schematic plan view of a belt with pockets and an attachable track for use in the device of FIG. 1.

FIG. 5A depicts a method of constructing belt 332 by attaching continuous guide tracks 141 and 143 to the sides of belt 332 before it is loaded into the scanner. FIG. 5A depicts belt 332 having pockets 34, 36 and 38 containing flat items to imaged 139, 137 and 135 respectively. Cut-aways of pockets 149 and 153 are also shown, demonstrating that the belt 332 may be of a variety of lengths selected by the user. Items 139, 137 and 135 are shown as irregular, off-center, skewed objects to demonstrate the capability of the present invention to take digital images of mal-aligned items within the pockets and employ computer software to align the final digital images. Each pocket 34, 36 and 38 has an upper opening 45, 41 and 37 sealed by an adhesive strip 46. The pockets are connected to one another by flexible connecting strips 123, 125, 145 and 147 which may be made of thin plastic or other suitable thin, durable, flexible material.

Each pocket in FIG. 5A has side flanges 111, 113, 115, 117, 119 and 121 which project from the left and right edges of the pockets. These flanges may be an extension of the pocket itself, or may be made from plastic or other suitable durable, thin material. In the embodiment shown in FIG. 5A, the flanges serve as connection points for attachable tracks 141 and 143. Tracks 141 and 143 are flexible lengths of thin, durable plastic (or other similar material) which permit belt 332 to engage the drive mechanism that pulls belt 332 through the scanner. Tracks 141 and 143 may possess holes 333 to engage a toothed drive wheel, or may have a surface without holes that may be friction-gripped by one or more drive wheels.

Tracks 141 and 143 may be stored separately from the belt 332 in, for example, a rolled spool of a continuous length of track. In preparing belt 332 for scanning, the operator of the scanner may cut a length of track to match the length of the belt 332, and then attach the track to the belt as shown in FIG. 5A. Where tracks 141 and 143 possess holes 333, care should be taken to align the tracks relative to one another such that the holes 333 on one track are aligned with the holes 333 on the second track. The tracks 141 and 143 may be attached to belt 332 by means of adhesive, heat welding, or any of a variety of commonly known techniques for affixing one flat object to another while maintaining a smooth fished surface. Once affixed to belt 332, tracks 141 and 143 will allow belt 332 to be fed through the scanner.

FIG. 5B depicts an alternative track attachment system 171 for attaching tracks 155 and 157 to belt section 432. Track system 171 is shown as a cut-away, but it will be understood that track system 171 may be of any length chosen by the user. Belt 432 is shown having pockets 175 and 181 with side flanges 167, 169, 179 and 183. Pockets 175 and 181 are connected to each other by flexible connecting strip 173.

Tracks 155 and 157 are joined to slot members 159 and 161, respectively. Slot members 159 and 161 each possess a slit for insertion of the belt flanges 167, 169, 179 and 183. Bendable connectors 163 and 165 connect slot members 159 and 161 to each other. Connectors 163 and 165 act to strengthen the track system 171 and maintain alignment of holes 433 on tracks 157 and 155 relative to each other.

Belt 432 may be slid into track system 171 as shown by arrow 185. Alternatively, track system 171 may be bent open to accommodate belt 432 by bending connectors 163 and 165 to cause members 159 and 161 to pull apart slightly as shown by arrow 175. Once track system 171 is bent apart, belt 432 may be inserted by first placing right flanges 169 and 179 in slot member 161, and then bending connectors 163 and 165 as shown by arrow 173 back to their original position such that slot member 159 engages flanges 161 and 183.

Connectors 163 and 165 may be made of a rigid or semi-rigid plastic that naturally returns to its original shape after being bent, thus assisting the user to bend the slot members to engage flanges 167, 169, 179 and 183 after connectors 163 and 165 have been bent to allow insertion of belt 432.

To secure belt 432 to track system 171 after belt 432 has been inserted, slot members 159 and 161 may be affixed to flanges 167, 169, 179 and 183 by means of adhesive, heat welding, snap fittings, or other commonly known technique for joining two surfaces together.

FIG. 6 shows an alternative belt and pocket construction 124. The belt has three pockets, 126, 128 and 130 formed with a hard plastic back wall and a hard plastic front wall 127, 129 or 131 hinged to the back wall and having adhesive spots 132 or snap fittings for use in closing the pocket. The three pockets shown in FIG. 6 are interconnected by folded lengths 144 and 146 or flexures of flexible plastic material to allow the pockets to be folded upon themselves accordion style.

A photograph 134, 136 or 138 is shown in each of the three pockets. Of course, the objects 134, 136 and 138 also can be one of the other scannable flat objects contemplated by the present invention.

Flexible strips 148 and 150 extend outwardly from the bottom and the top pockets as shown. This is illustrative of further flexible hinge strips or flexures interconnecting further pockets to form a relatively long belt.

Flanges 140 and 142 extend from the sides of each of the pockets. They are separated from one another by gaps such as those at 144 and 146 to allow the pockets to fold flat against one another for compact storage.

The hard-walled pockets in the belt 124 may be useful in handling certain items to be scanned, such as curled photographs, etc. Also, they may stack together more securely than flexible belts.

The drive system for moving the belt past the target area of the scanner can be adapted easily to compensate for the gaps between the sequential flanges 140 and 142, as it will be shown below.

FIG. 7 shows a modified belt 151 which is like the belt 124 shown in FIG. 6 except that the covers 152, 154 and 156 for each of the pockets is a relatively thin and flexible transparent sheet instead of a hard cover. The sheet-form cover is made to cling to the hard plastic back wall either by static electricity prevalent in such plastic objects, or by optional adhesive patches 158.

It is possible that the covers will remain in place, covering the objects 134, 136, and 133 in them, due to being flattened against the rear wall structure, at least during scanning.

In the belt embodiments shown in FIGS. 6 and 7, the leading or trailing edge of the gap in the flanges can be detected by the detector 80, or any other structural formation (e.g., another edge or a tractor feed hole) can be used as a detection point to trigger the strobe lamps.

FIGS. 8 and 9 show another pocketed belt 159 which is specially designed to scan objects such as objects 178 and 180 which are relatively thick.

Each of the pockets has a stiff back wall member 160, 162 which is hinged to the next pocket by means of flexible plastic strips or flexures 164.

A relatively thin, transparent, flexible membrane or film forms a pocket 166 or 168 with an entrance opening 179 or 181. Flanges 170 and 172, 174 and 176 extend from the sides of the pockets. Each flange has square holes 175 for a type of tractor feed mechanism shown in FIG. 10.

The belt 159 shown in FIGS. 8 and 9 provides a solution to a problem with scanners of the type described herein in that there is a need for the surface being scanned to remain in the focal plane of the digital camera 24. Also, the relatively great thickness of the object 178 and 180 dictate a modification of the pocket structure so as to provide a flexible, relatively capacious pocket.

Keeping the surfaces of the objects 178 and 180 in the focal plane of the camera is accomplished providing a transparent plate, for example, a piece of glass 182 (FIG. 9), under which the belt is moved by rollers 184 mounted on a spring support 186 which is issued to apply light pressure to the belt to hold the upper surfaces of the pockets against the glass plate 182. This keeps the upper surfaces of the objects 178 and 180 in focus, and helps assure smoothness and flatness of the upper surface of the pocket.

The focal range of the camera may be adjusted by the operator as needed. However, greater efficiency is achieved by ensuring that all objects within the pockets have similar thickness during any given period of operation of the scanner. This will ensure that all objects within the pockets remain within the acceptable limits of the selected focal range of the camera.

Further Drive Mechanisms

FIG. 10 shows a tractor-feed mechanism 200 for use as an alternative to the feed mechanism shown in FIGS. 1-3. The feed mechanism 200 consists of at least one drive roller 196, driven by a drive motor such as shown in FIG. 1, and a plurality of idler rollers 198. Each of the two rubber belts 188 and 190 has evenly spaced rectangular projections 194, 195 which extend through the holes 33 in the flanges of the belt 32. The holes 33 are slightly larger than the projections so as to admit them readily.

FIG. 10A, which is a cross-sectional view taken along line 10A-10A of FIG. 10, shows that guides 189, 191 and 193 are provided for the belts 188 and 190, and to rotatably support the rollers 198, etc. The structure of FIG. 10A is not shown in FIG. 10 in order to simplify the drawing. An upper holder plate, 191 can be slightly tapered along its length, as indicated at 197, and thus provide for gradually increasing tension across the pockets of the belt together with the longitudinal tension described above, to make sure that the upper surfaces of the pockets are pulled tight and smooth to minimize distortion and reflected light scatter.

FIGS. 11 and 12 show an accordion-folded stack 202 of interconnected pockets, like those shown in FIG. 6, which are being fed into a drive system consisting of a toothed drive wheel 226, and a pair of soft drive rollers, 224 and 230. Stack 202 is held in a container 204.

The stack 202 also could be rotated 90 degrees from the position shown so that the pockets are horizontal.

The drive system in FIGS. 11 and 12 is shown as it is pulling a first pocket 206 out of the stack container 204 and connected pockets 210, 214, 218 and 222 are in a position to which they are moved by the drive system. Flexible interconnecting flaps or flexures 208, 212, 216 and 220 allow the pockets to bend relative to one another. As shown in FIG. 11, the two toothed wheels 226 and two rows 228 of projections to fit into the grooves 140 and 142 in the flanges of the pockets. This engagement is shown in FIG. 12 as the drive wheel 226 moves the belt in the direction indicated by the arrow 231.

As it can be seen in FIG. 11, the soft roller 224 and its mating roller 230, which are made of soft artificial or natural fabric, grips the sides of the hard pockets 222 and urges them toward the scanning target station.

Figure 13:
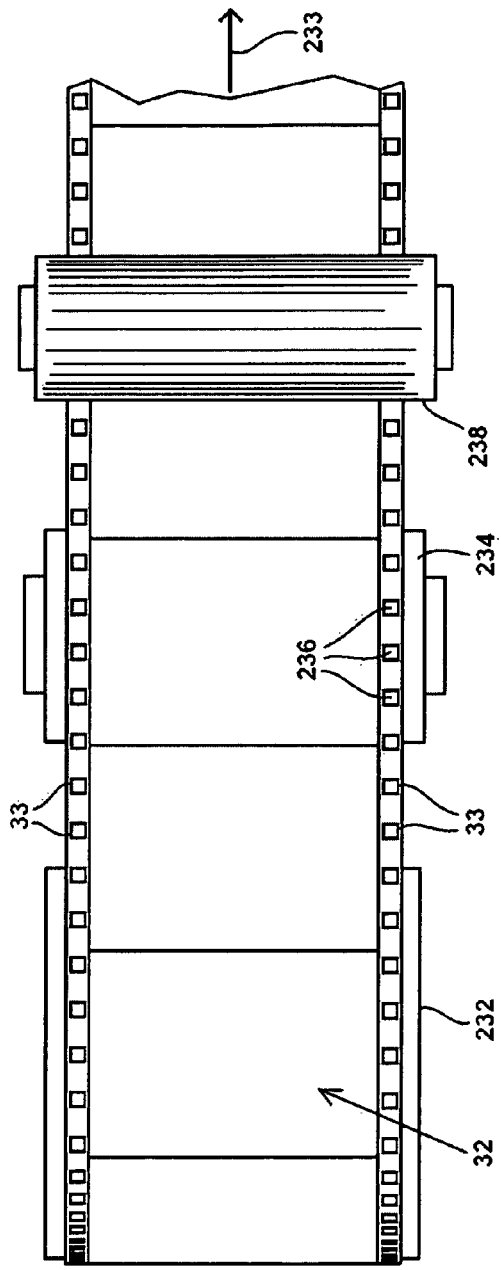
FIG. 13 is top plan view, and FIG. 14 view is a side elevation view of another storage and feed mechanism for use in the device in FIG. 1.
Figure 14:
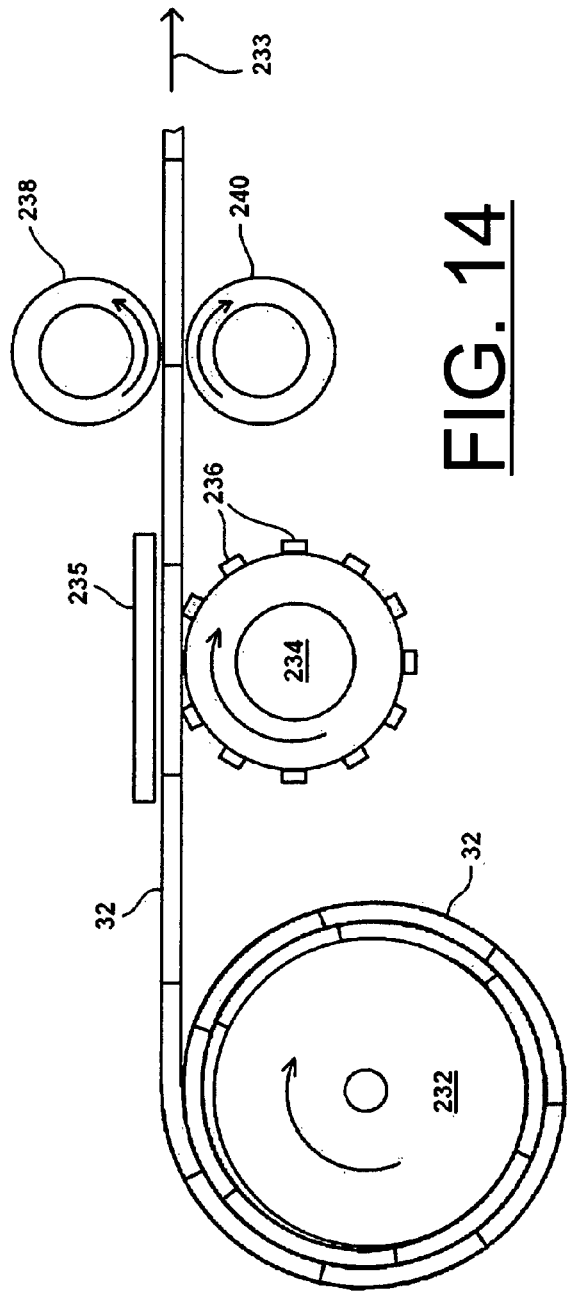

FIGS. 13 and 14 show a drive and storage system in which flexible pocketed belts 32 are stored in roll form in a cylinder 232 which rotates as the belt is moved in the direction indicated by the arrow 233. A drive roller with extending teeth 236 is provided. An opposed plate 235 is provided to guide the belt 32 and prevent the teeth 236 from becoming disengaged from the holes 33. The roller 234 pulls the belt 32 from the roll 232. Soft rollers 238 and 240 are provided downstream from the drive wheel 234 to guide and further drive the belt.

Figure 15:
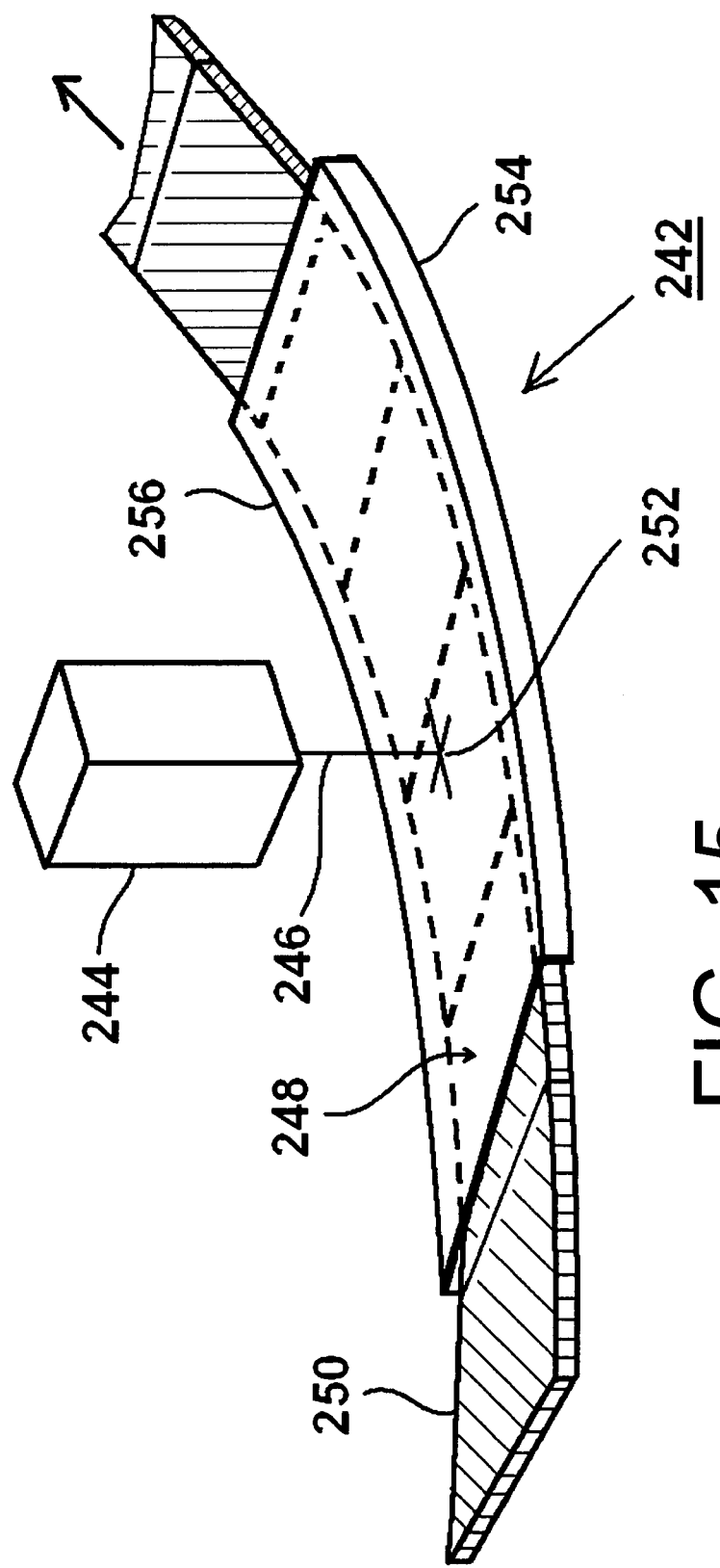
FIG. 15 is a schematic perspective view of a curved transparent guide for use in the device of FIG. 1.

FIG. 15 shows a guide structure 242 using a transparent curved guide 248 to guide a belt 250 which is flexible as the one shown in FIGS. 1 and 5 as it moves past the target area 252 viewed along the line 246 by a camera 244. The transparent guide structure 242 helps to smooth the upper surfaces of the pockets to minimize image distortion and reflected light scatter.

The guide 248 has side flanges 254 and 256 which preferably leave the underside of the guide open along the bottom. Drive wheels (not shown) pull and guide the belt 250 through the guide 248 for scanning purposes.

The curved guide 248 tends to hold the upper surface of the belt in the focal plane of the camera 244 and helps to maintain a smooth surface on the pocket to improve image quality and reduce unwanted light reflection. Any pocket openings on belt 250 should be oriented such that they will not catch against plate 248 as belt 250 is dragged underneath it. The surface of plate 248 may be coated with a thin layer of transparent polytetrafluoroethylene (or other transparent lubricant) to allow the belt 250 to slide easily across its surface.

Figure 16:
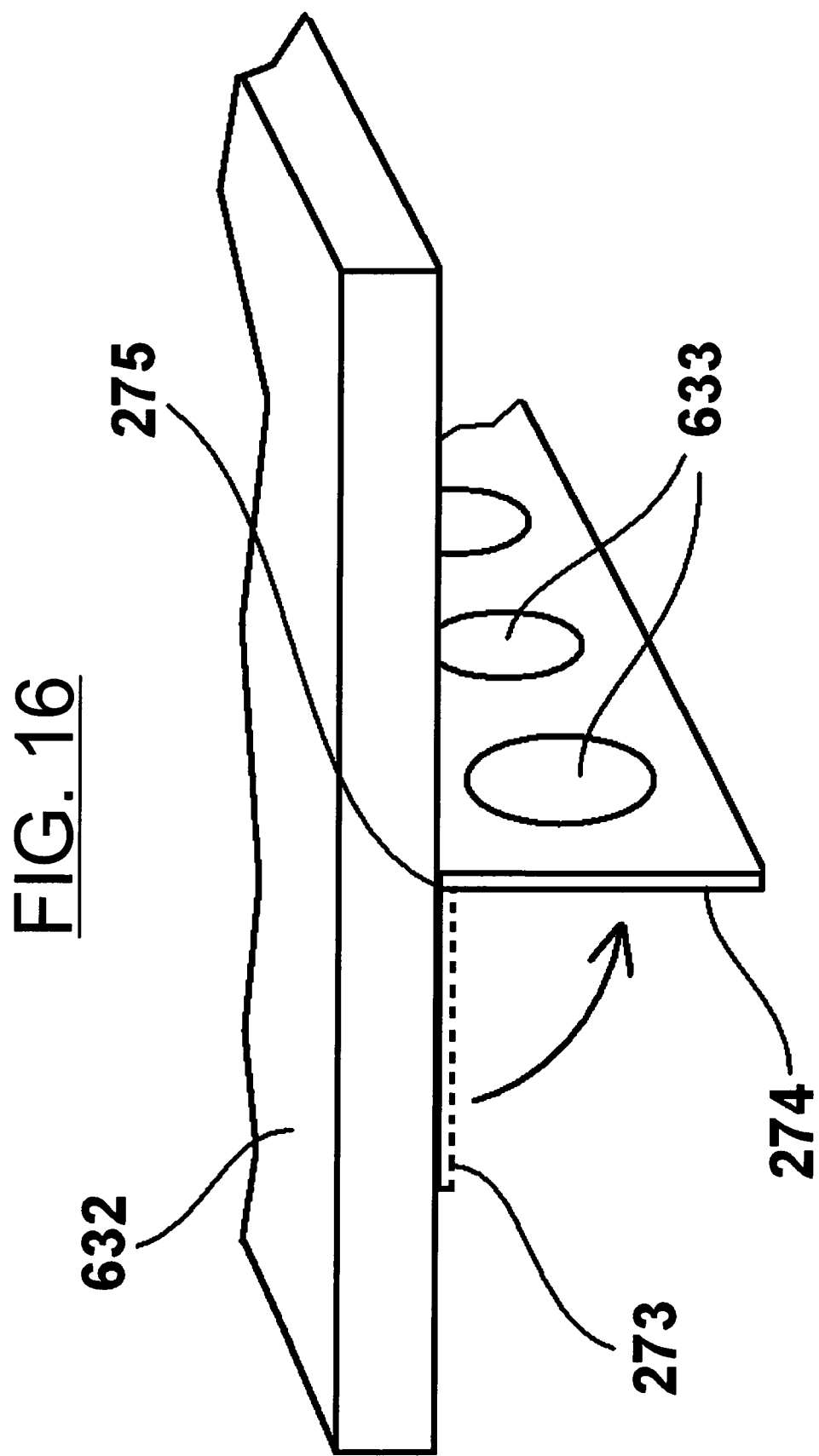
FIG. 16 is a partially schematic perspective view of a belt and track system for use with the device in FIG. 1.

FIG. 16 depicts an alternative construction of belt 632 (shown as a cut-away) which includes a track 274 with gear holes 633. Holes 633 permit track 274 to engage a rotary drive gear below belt 632 in order to pull belt 632 through the scanner. Belt 632 may possess an attachment point, such as a fitted groove, for attachment of track 274 prior to feeding belt 632 through the scanner. Alternatively, track 274 may be attached to belt 632 by hinge 275 which permits track 274 to be folded flush against the underside of belt 632 when not in use as shown at position 273. Track 274 may be made of plastic or other suitable lightweight rigid or semi-rigid material.

In an alternative embodiment, track 274 may have a flat surface without holes 633, which flat surface can be gripped by friction rollers below belt 632. Alternatively, track 274 might project only a minimal amount from the underside of belt 632 and have gear teeth or a series of equidistant grooves, either of which could be engaged by a toothed drive gear below belt 632. Such a track could be attached to belt 633 by an adhesive or a snap-fit connection.

FIG. 16A is a depiction of a gear system 280 with pegs 276 for engaging holes 633 on monorail track 274. Gear system 280 turns, causing belt 632 to move in the direction indicated by arrow 278. As belt 632 moves, it slides down a bounded track 284 with sides 270 and 272. Track 274 fits through opening 282 and protrudes below track 284. Track 284 is rigidly fixed to the body of the scanner, and acts to minimize any lateral movement of belt 632 as it is pulled through the scanner. Track 284 may be made of rigid plastic or metal, and may be coated with polytetrafluoroethylene or other non-stick coating to facilitate the sliding of belt 632 across track 284. Track 284 is shown as a cut-away in FIG. 16A, though it will be understood that track 284 may be as long as necessary to convey belt 632 through the scanner.

Figure 16B:
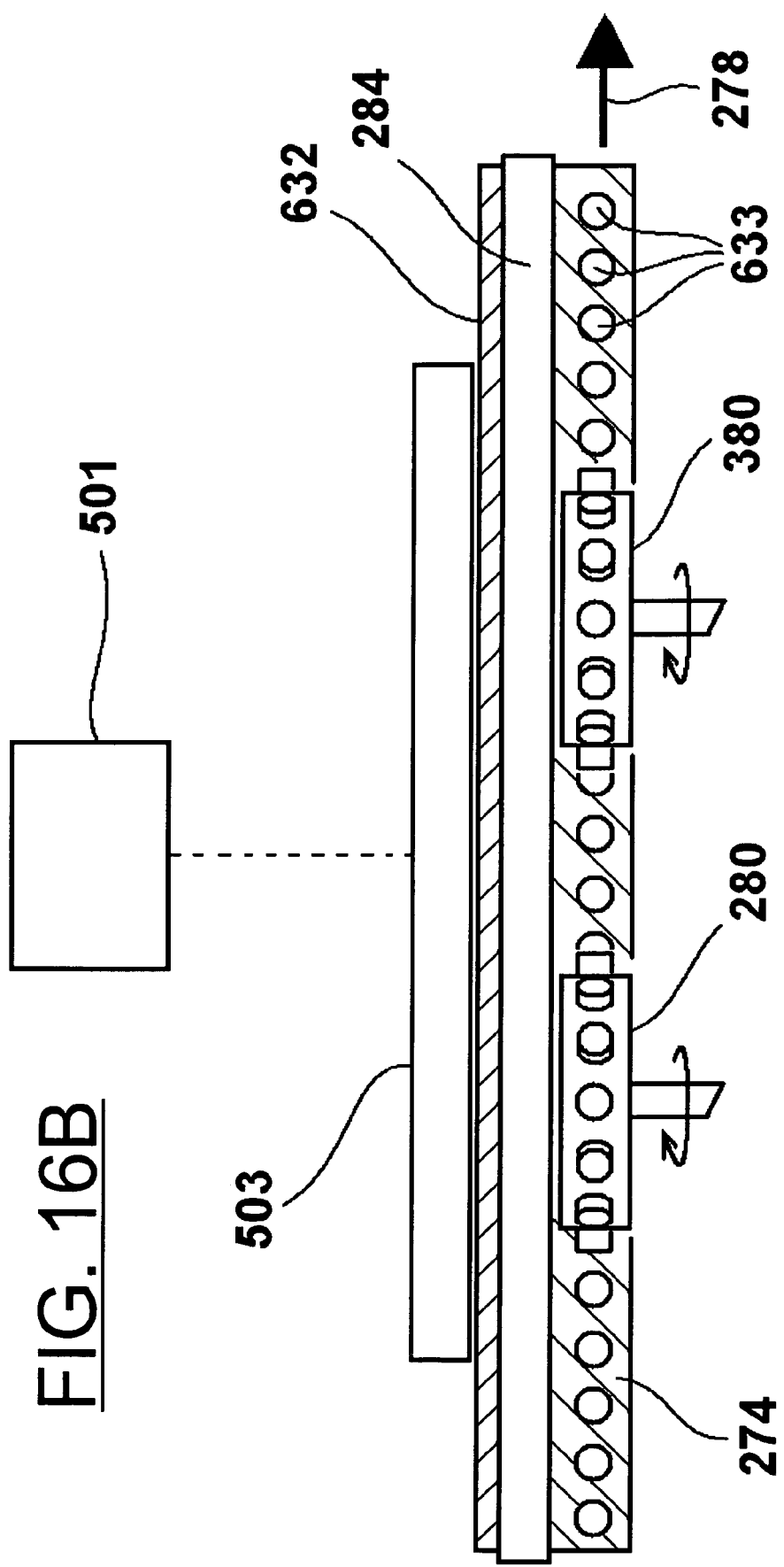
FIG. 16B is a partially schematic side elevation view of a belt, tack and drive mechanism for use with the device in FIG. 1; and, FIG. 17 is a schematic side elevation view of a drive mechanism for use with the device in FIG. 1.

FIG. 16B demonstrates one manner in which the drive system depicted in FIG. 16A may be used in conjunction with a flat, transparent guide plate 503. Belt 632 may be pressed flush against transparent plate 503 by means of track 284 in order to assist in removing any wrinkles or curvature in the surface of the pockets on belt 632 to be imaged by camera and illumination system 501. The surface of plate 503 may be coated with a thin layer of transparent polytetrafluoroethylene (or other transparent lubricant) to allow the belt 632 to slide easily across its surface. Any pocket openings on belt 632 should be oriented such that they will not catch against plate 503 as belt 632 is dragged underneath it.

Figure 17:
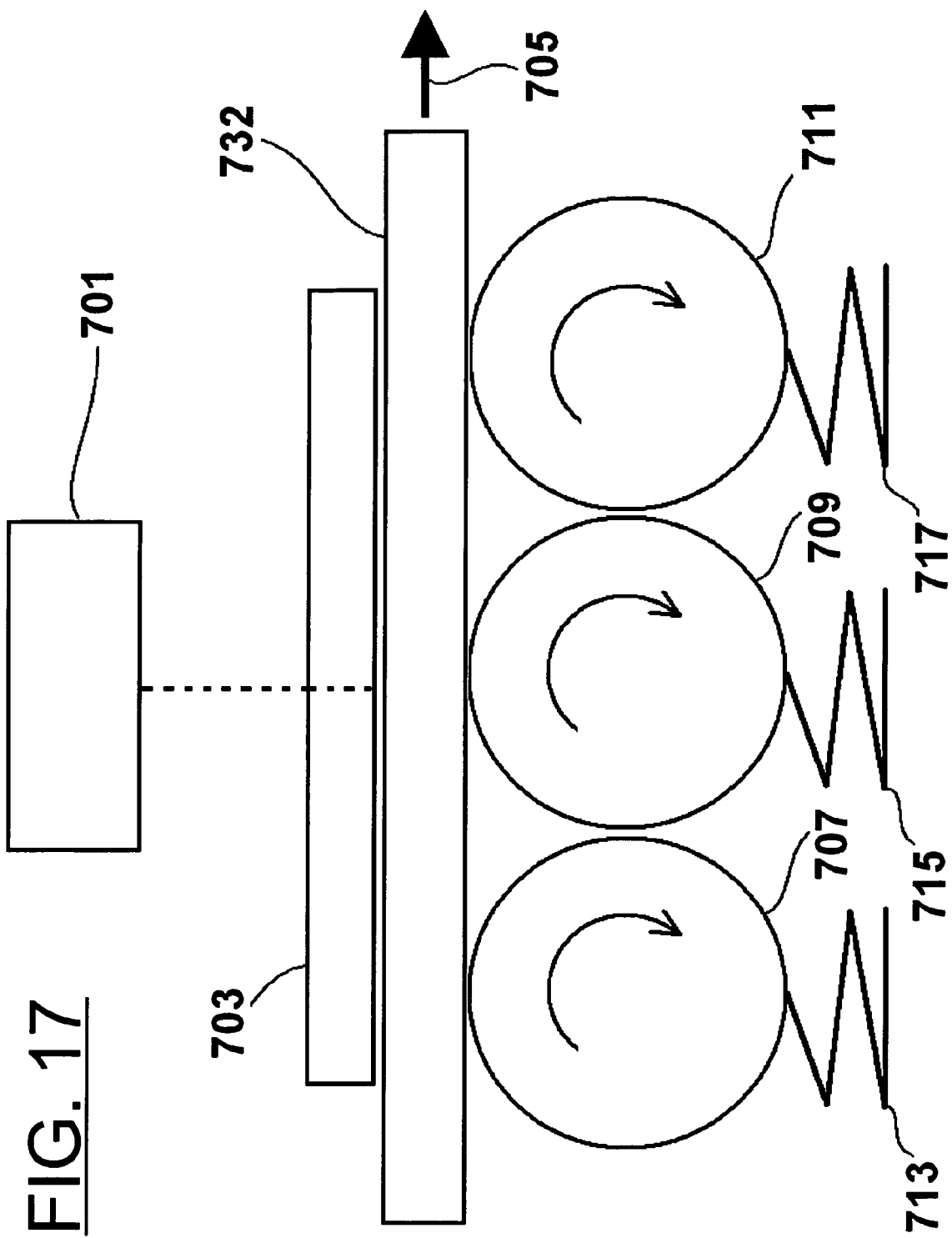

FIG. 17 shows an alternative conveyance system in which padded drive rollers 707, 709 and 711 cause belt 732 to move in the direction indicated by arrow 705. Padded rollers 707, 709 and 711 are pressed upwardly against the underside of belt 732 by spring systems 713, 715 and 717. In turn, rollers 707, 709 and 711 press belt 732 against transparent plate 703. Plate 703 acts to remove any wrinkles or curvature in the surface of the pockets on belt 732 to be imaged by camera and illumination system 701. The surface of plate 703 may be coated with a thin layer of transparent polytetrafluoroethylene (or other transparent lubricant) to allow the belt 732 to slide easily across its surface. Any pocket openings on belt 732 should be oriented such that they will not catch against plate 703 as belt 732 is dragged underneath it. In the embodiment shown in FIG. 17, the back panel of each pocket on belt 732 should possess a neutral color background to aid in image processing by the scanner's computer system.

Although the invention has thus been shown and described with reference to specific embodiments, it should be noted that the invention is in no way limited to the details of the described arrangements but changes and modifications may be made without departing from the scope of the invention which is defined by the appended claims.

The invention claimed is:

1. A device for capturing digital images of a plurality of sheets, said sheets having a thickness of less than a millimeter and being flexible enough to be susceptible to creasing by pressure from a human hand, said device comprising:
   (a) an elongated pocketed belt with a plurality of pockets along the length of said belt; each of said pockets having a front wall and a back wall opposite said front wall; each of said pockets capable of holding at least one of said sheets between said front wall and said back wall; each of said sheets having a surface to be imaged adjacent to said front wall;
   (b) a scanner capable of capturing in a single exposure, for each of said sheets, a digital image of said surface to be imaged, said scanner including (A) a digital camera viewing a target area along a line of sight, the field of view of said digital camera in said target area encompassing at least said surface to be imaged; and (B) a light source for shining light on said target area;
   (c) each of said front walls having a portion transparent to said light, said transparent portion being at least coextensive with said surface to be imaged of said sheet;
   (d) an automated drive mechanism for moving said belt past said target area with each of said pockets moving through said target area in succession without stopping;
   (e) an automated image-freezing means comprising said light source employed as a strobe;
   (f) a glare reducer.

2. A device as in claim 1 in which a subtractive contrast surface is located along said line of sight opposite said sheet from said digital camera, said subtractive contrast surface selected from the group consisting of (A) a contrast surface physically separate from said belt located along said line of sight opposite said belt from said digital camera, and (B) said back walls of said pockets; said contrast surface having sufficient contrast with said surfaces to be imaged of said sheets to permit a computer to automatically subtract said contrast surface from said digital images.

3. A device as in claim 1 including a computer capable of effectively cropping said digital images to remove portions of said digital images not bearing portions of said surfaces to be imaged of said sheets.

4. A device as in claim 1 including a rigid plate located along said line of sight of said digital camera and adjacent to said belt, and wherein said plate has a smooth broad surface, and wherein said broad surface is substantially parallel to said belt, and wherein said belt is capable of sliding past said broad surface, and wherein said device is so constructed as to apply a force to said pockets of said belt to press said pockets against said plate in said target area to perform an action selected from the group consisting of (A) substantially flattening at least a portion of at least one of said walls of said pockets, and (B) pressing said transparent portions of said front walls of said pockets flush against said surfaces to be imaged of said sheets in said pockets.

5. The device of claim 1 wherein said glare reducer is chosen from the group consisting of (A) said light source being a diffuse illuminator, (B) said light source being a darkfield illuminator, and (C) a polarizing filter between said camera and said surface to be imaged.

6. The device of claim 1 wherein said device is capable of capturing said digital images at a rate of between one and five per second.

7. The device of claim 1 wherein said device is capable of capturing said digital images at a rate of between five and ten per second.

8. The device of claim 1 wherein said glare reducer is said light source employed as a darkfield illuminator, and said darkfield illuminator shines said light at a high enough angle to said pockets such that substantially no defects are highlighted in said transparent portions of said pockets.

9. A method of capturing digital images of a plurality of sheets, said sheets having a thickness of less than a millimeter and being flexible enough to be susceptible to creasing by pressure from a human hand, said method comprising:
   (a) providing an elongated pocketed belt with a plurality of pockets along the length of said belt; each of said pockets having a front wall and a back wall opposite said front wall; each of said pockets capable of holding at least one of said sheets between said front wall and said back wall; each of said sheets having a surface to be imaged;
   (b) providing a scanner capable of capturing in a single exposure, for each of said sheets, a digital image of each of said surfaces to be imaged of said sheets, said scanner including (A) a digital camera viewing a target area along a line of sight, the field of view of said digital camera in said target area encompassing at least said surface to be imaged, and (B) a light source for shining light on said target area; each of said front walls having a portion transparent to said light, said transparent portion being at least coextensive with said surface to be imaged of said sheet;
   (c) providing a glare reducer;
   (d) providing an automated drive mechanism for moving said belt past said target area with each of said pockets moving through said target area in succession without stopping;
   (e) obtaining the insertion of a plurality of said sheets into said pockets on said belt;
   (f) feeding said belt through said target area using said drive mechanism;
   (g) strobing said light source so as to effectively permit said digital camera to capture said digital images of said surfaces of said sheets in said target area with said digital images being substantially free of motion blur;
   (h) capturing said digital images with said digital camera.

10. A method as in claim 9 including the step of employing a computer to crop said digital images to remove portions of said digital images not bearing portions of said surfaces to be imaged of said sheets.

11. A method as in claim 9 including the additional step of retaining said sheets in said pockets for a purpose selected from the group consisting of (A) long term storage of said sheets and (B) shipment of said sheets.

12. A method as in claim 9 wherein said glare reducer is selected from the group consisting of (A) said light source being a diffuse illuminator, (B) said light source being a dark field illuminator, and (C) a polarizing filter between said camera and said surface to be imaged.

13. A method as in claim 9 including charging a fee for said method to be performed;
   and including allowing a customer to perform said sheet insertion step; and including allowing said customer to cause the delivery of said belt with said sheets inserted therein to a central processing location, and wherein said processing location performs said method for said customer and other like customers.

14. A method as in claim 9 wherein said digital images are captured at a rate of between one and five per second.

15. A method as in claim 9 wherein said digital images are captured at a rate of between five and ten per second.

16. A method as in claim 9 including charging a fee for said method to be performed;
   and including allowing identifying markings to be placed on said belt as desired by a customer;
   and including supplying a computer capable of responding to said identifying markings on said belt by performing a process selected from the group consisting of (A) placing said digital image in a particular computer folder and (B) associating identifying information with said digital image.

17. A method as in claim 9 including selecting a darkfield illuminator as said glare reducer and aiming said darkfield illuminator at a high enough angle to said pockets such that substantially no defects are highlighted in said transparent portions of said pockets.

18. A device for rapidly capturing digital images of a plurality of thin, flexible sheets, said device comprising:
   (a) an elongated pocketed belt with a plurality of pockets along the length of said belt; each of said pockets having a front wall and a back wall opposite said front wall; each of said pockets capable of holding at least one of said sheets between said front wall and said back wall; each of said sheets having a surface to be imaged adjacent to said front wall,
   (b) a scanner capable of capturing in a single exposure, for each of said sheets, a digital image of said surface to be imaged, said scanner including (A) a digital camera viewing a target area along a line of sight, the field of view of said digital camera in said target area at least encompassing said surface to be imaged; and (B) a light source for shining light on said target area;
   (c) each of said front walls having a portion transparent to said light, said transparent portion being at least coextensive with said surface to be imaged of said sheet;
   (d) an automated drive mechanism for moving said belt past said target area with each of said pockets moving through said target area in succession without stopping; and
   (e) an automated image-freezing means comprising a shutter on said digital camera.

19. The device of claim 18 wherein said sheets have a thickness of less than a millimeter and are flexible enough to be susceptible to creasing by pressure from a human hand; and including a glare reducer selected from the group consisting of (A) said light source being a diffuse illuminator, (B) said light source being a darkfield illuminator, and (C) a polarizing filter between said camera and said surface to be imaged.

20. The device of claim 19 wherein said glare reducer is a darkfield illuminator and said darkfield illuminator shines said light at a high enough angle to said pockets such that substantially no defects are highlighted in said transparent portions of said pockets.

21. The device of claim 18 wherein said device is capable of capturing said digital images at a rate of between one and five per second.

22. The device of claim 18 wherein said device is capable of capturing said digital images at a rate of between five and ten per second.

23. A device as in claim 18 in which a subtractive contrast surface is located along said line of sight opposite said sheet from said digital camera, said subtractive contrast surface selected from the group consisting of (A) a contrast surface physically separate from said belt located along said line of sight opposite said belt from said digital camera, and (B) said back walls of said pockets; said contrast surface having sufficient contrast with said surfaces to be imaged of said sheets to permit a computer to automatically subtract said contrast surface from said digital images.

24. A device as in claim 18 including a computer capable of effectively cropping said digital images to remove portions of said digital images not bearing portions of said surfaces to be imaged of said sheets.

25. A device as in claim 18 including a rigid plate located along said line of sight of said digital camera and adjacent to said belt, and wherein said plate has a smooth broad surface, and wherein said broad surface is substantially parallel to said belt, and wherein said belt is capable of sliding past said broad surface, and wherein said device is so constructed as to apply a force to said pockets of said belt to press said pockets against said plate in said target area to perform an action selected from the group consisting of (A) substantially flattening at least a portion of at least one of said walls of said pockets, and (B) pressing said transparent portions of said front walls of said pockets flush against said surfaces to be imaged of said sheets in said pockets.

26. A method of rapidly capturing digital images of a plurality of thin, flexible sheets, said method comprising:
(a) providing an elongated pocketed belt with a plurality of pockets along the length of said belt; each of said pockets having a front wall and a back wall opposite said front wall; each of said pockets capable of holding at least one of said sheets between said front wall and said back wall; each of said sheets having a surface to be imaged;
(b) providing a scanner capable of capturing a digital image of each of said surfaces to be imaged of said sheets, said scanner including (A) a digital camera viewing a target area along a line of sight, and (B) a light source for shining light on said target area; each of said front walls having a portion transparent to said light, said transparent portion being at least coextensive with said surface to be imaged of said sheet;
(c) providing an automated drive mechanism for moving said belt past said target area with each of said pockets moving through said target area in succession without stopping;
(d) obtaining the insertion of a plurality of said sheets into said pockets on said belt;
(e) feeding said belt through said target area using said drive mechanism;
(f) opening and closing said shutter at a sufficient rate to effectively permit said camera to capture said digital images of said surfaces of said sheets in said target area with said digital images being substantially free of motion blur; and
(g) capturing said digital images with said digital camera.

27. The method of claim 26 including selecting said sheets to have a thickness of less than a millimeter and to be flexible enough to be susceptible to creasing by pressure from a human hand; and including providing a glare reducer selected from the group consisting of (A) said light source being a diffuse illuminator, (B) said light source being a darkfield illuminator, and (C) a polarizing filter between said camera and said surface to be imaged.

28. A method as in claim 27 including selecting a darkfield illuminator as said glare reducer and aiming said darkfield illuminator at a high enough angle to said pockets such that substantially no defects are highlighted in said transparent portions of said pockets.

29. A method as in claim 26 wherein said digital images are captured at a rate of between one and five per second.

30. A method as in claim 26 wherein said digital images are captured at a rate of between five and ten per second.

31. A method as in claim 26 including charging a fee for said method to be performed; and including allowing identifying markings to be placed on said belt as desired by a customer; and including supplying a computer capable of responding to said identifying markings on said belt by performing a process selected from the group consisting of (A) placing said digital image in a particular computer folder and (B) associating identifying information with said digital image.

32. A method as in claim 26 including charging a fee for said method to be performed;
and including allowing a customer to perform said sheet insertion step; and including allowing said customer to cause the delivery of said belt with said sheets inserted therein to a central processing location, and wherein said processing location performs said method for said customer and other like customers.

33. A method as in claim 26 including the step of employing a computer to crop said digital images to remove portions of said digital images not bearing portions of said surfaces to be imaged of said sheets.

34. A method as in claim 26 including the additional step of retaining said sheets in said pockets for a purpose selected from the group consisting of (A) long term storage of said sheets and (B) shipment of said sheets.

* * * * *